(12) United States Patent
Gromoll et al.

(10) Patent No.: US 8,457,043 B2
(45) Date of Patent: Jun. 4, 2013

(54) METHOD AND SYSTEM FOR SENDING, ROUTING, AND RECEIVING INFORMATION USING CONCISE MESSAGES

(75) Inventors: Stefan Gromoll, Setauket, NY (US); Kenneth M. Lanzetta, Smithtown, NY (US)

(73) Assignee: Scientific Media, Setauket, NY (US)

( * ) Notice: Subject to any disclaimer, the term of this patent is extended or adjusted under 35 U.S.C. 154(b) by 1259 days.

(21) Appl. No.: 12/125,014

(22) Filed: May 21, 2008

(65) Prior Publication Data

US 2008/0291899 A1 Nov. 27, 2008

Related U.S. Application Data

(60) Provisional application No. 60/939,296, filed on May 21, 2007, provisional application No. 60/983,554, filed on Oct. 29, 2007.

(51) Int. Cl.
*H04W 4/00* (2009.01)
*H04B 7/216* (2006.01)
*G06Q 20/00* (2012.01)
*G06F 15/16* (2006.01)

(52) U.S. Cl.
USPC .............................. 370/328; 370/335; 705/80

(58) Field of Classification Search
None
See application file for complete search history.

(56) References Cited

U.S. PATENT DOCUMENTS

| | | | |
|---|---|---|---|
| 6,385,583 B1 | 5/2002 | Ladd et al. | |
| 6,560,456 B1 | 5/2003 | Lohtia et al. | |
| 6,738,630 B2 | 5/2004 | Ashmore | |
| 6,934,702 B2 | 8/2005 | Faybishenko et al. | |
| 7,020,685 B1 * | 3/2006 | Chen et al. | 709/204 |
| 7,127,455 B2 | 10/2006 | Carson et al. | |
| 7,196,639 B2 | 3/2007 | Joyce et al. | |
| 2002/0052912 A1 | 5/2002 | Griswold et al. | |
| 2004/0093228 A1 | 5/2004 | Carson et al. | |
| 2004/0093580 A1 | 5/2004 | Carson et al. | |
| 2004/0177042 A1 * | 9/2004 | Fostick | 705/51 |
| 2005/0009500 A1 | 1/2005 | Ear | |
| 2006/0063515 A1 | 3/2006 | Alston | |
| 2006/0069664 A1 | 3/2006 | Ling et al. | |
| 2006/0184625 A1 | 8/2006 | Nordvik et al. | |
| 2007/0050371 A1 | 3/2007 | Johnson et al. | |
| 2007/0106568 A1 * | 5/2007 | Asher et al. | 705/26 |

OTHER PUBLICATIONS

International Search Report and Written Opinion from PCT/US08/64425 issued Feb. 12, 1009.

* cited by examiner

*Primary Examiner* — Melanie Jagannathan
(74) *Attorney, Agent, or Firm* — Eleanor M. Musick; Procopio, Cory, Hargreaves & Savitch LLP

(57) ABSTRACT

A system and method are provided for communication between a communication device and a content provider associated with an internet domain name and a server. The system includes a network with a user interface, an internet connection, and an interface to the content provider's internet domain. A communication device user enters a concise message request which includes a channel, a designator and, optionally, a request instruction. The combination of the channel and the designator specify a location on the internet at which routing instructions reside for responding to the concise message request and generating a concise message response for output to the communication device. Concise message documents can be generated for effecting financial transactions such as purchases and payments via SMS. CMRL can also be used to route person-to-person messaging through a content provider's internet domain at which the users may be registered.

31 Claims, 4 Drawing Sheets

METHOD AND SYSTEM FOR SENDING, ROUTING, AND RECEIVING INFORMATION USING CONCISE MESSAGES

RELATED APPLICATIONS

This application claims the priority of U.S. Provisional Application No. 60/939,296, filed May 21, 2007, and U.S. Provisional Application No. 60/983,554, filed Oct. 29, 2007, both of which are incorporated herein by reference.

FIELD OF THE INVENTION

The present invention relates to a method for information dissemination and information retrieval using concise messages sent over a variety of media, including mobile phone text messaging. Specifically, the present invention allows concise message content to be made available and readily accessible to those seeking information with communications devices such as mobile phones.

BACKGROUND OF THE INVENTION

Mobile phones have become ubiquitous in the US over the past decade. SMS (short message service), popularly known as "text messaging", has grown in popularity over the past several years to become one of the most widely used mobile phone features. Projections estimate that 80 billion SMS messages will be sent per month in 2008. As a result, services have begun to emerge which seek to provide useful concise information to mobile phone users by SMS (and other media), such as weather forecasts, sports scores, etc. Since many mobile phones are limited by small displays and restricted input mechanisms, a method of quickly and easily locating concise content is of interest to mobile phone users and hence to content providers seeking to enter and serve the mobile market.

One approach to address this need is to provide services for end users by creating repositories of useful information and making that information available via some kind of search engine. Such a model has been adopted by the SMS service of 4info.net, under the short code $INFO (44636), the SMS service of GOOGLE®, under the short code GOOGLE (466453), and others. For example, the text message request "weather 90210" sent to the 4info.net short code 4INFO may return a weather forecast for the zip code 90210. The primary limitation of this approach is that it requires the service provider to provide all possible information in which an end user might be interested. However, if an end user wishes to find a review of a particular vintage of wine and neither 4info.net nor GOOGLE® offer wine review, the user will be disappointed. The widespread usage of mobile phones across all demographics and the vast variety of information that has been made available on the internet suggest that this approach can only be a partial solution.

A second approach to address this need allows content providers to offer content via mobile media. This is the approach adopted by, e.g., Mobivity.com, which allows content providers to reserve SMS "keywords" under the Mobivity.com "shared" short code 95495. For example, a news organization may reserve the keyword "news" and return breaking news headlines in response to the text message request "news" sent to the short code 95495. There are several limitations of this approach. First, there is no method for searching for content across the various shared short codes and no way for end users to search for short codes using their mobile devices. For example, wine reviews may be offered on one shared short code and breaking news headlines on another. The user would be required to remember which is which, if they could even find the shared short codes in the first place. Next, as more and more content becomes available, the logical organization of content under a shared short code becomes more and more difficult, especially as different content providers begin to offer similar types of content. For example, if a news organization was to reserve the keyword "cnn", the end user would reasonably expect that "cnn" refers to the news organization CNN®, when, in fact, it might refer to some other news organization. Should CNN reserve the keyword "cnn," the keyword "news," or some other keyword? Next, shared short codes make no provision for allowing multiple authorship of content. Shared short code services can provide a single keyword to a large organization such as a university but present no mechanism for allowing the tens of thousands of students, faculty, and staff of the university to make their content available under the university keyword. Finally, this approach typically treats different media such as SMS and voice independently, requiring the content provider to prepare their content for each medium individually, by entirely unrelated mechanisms.

Similar issues present themselves in the area of mobile payment systems, such as those offered by OBOPAY™ and PAYPAL®, and the GILBARCO® RFID technology. These payment systems typically allow for payments to be sent either directly to the mobile phone carrier ("Premium Billing") or from one mobile phone user to the account of another mobile phone user or a merchant.

For these payment systems, much of the related art is focused on identifying a payee via a single identifier. For example, PAYPAL® Mobile allows any user to request money from any other user by SMS with the syntax "get x from y", where x is an amount and y is a phone number or email address. Sending the text message "get 5 from 4085552388" to the short code PAYPAL (729725) would send a request for $5.00 to the phone number 408-555-2388 via the PAYPAL® payment system. Other related art allows for mobile payments to be requested from or directed to a user specified by a word identifying an account. For example, a payment request by SMS might read "gpay Starbucks357 3.50". In this example, the payee is identified by the word "Starbucks357," and the amount to be paid is $3.50.

One of the main problems with existing payment systems such as PAYPAL® Mobile or OBOPAY arises in the field of mobile commerce ("m-commerce"). In particular, larger organizations such as the STARBUCKS® chain of cafes might hope to identify each store with an identifier such as "starbucksXXX," where XXX is the store number. But who has authority over the "starbucks" identifiers? The related art provides no clear mechanism for assigning and managing ownership of these identifiers with STARBUCKS® and STARBUCKS® franchise cafes or for presenting someone unrelated to STARBUCKS® from reserving "starbucksYYY," where YYY is a non-reserved (or as yet non-existent) STARBUCKS® store. Does the identifier "amazon" refer to the on-line merchant AMAZON.COM® or to some other merchant? Does the identifier "buy" refer to the on-line merchant Buy.com or to some other merchant? Here the problem is very similar to the ambiguity regarding ownership of the keywords "cnn" and "news" described previously.

A second problem with the existing methods as they relate to m-commerce arises from the fact that they make no provision for associating a payment with a particular transaction, for example at a point-of-sale location. For example, a particular STARBUCKS® franchise might want to allow users to text in a payment for an order which has been entered at cash register. However, there is no a priori connection between the order on the cash register and the payment sent in by the user. Hence, the current methods address solely the question of sending money, instead of offering a more comprehensive solution for selling products.

A third problem of current methods as they relate to m-commerce is the need to disclose personal information such as a phone number, email address, or account name when requesting or sending a payment. For example in order to allow a business to request a payment from a user using the PAYPAL® system (e.g., if an order is registered at a cash register), the user would be required to disclose their phone number so that the business could send the request to that user.

Finally, the existing methods as they relate to m-commerce are typically designed to be used person to person and often do not provide an integrated means for a computer (e.g. a cash register) to request or receive payment from a mobile user for a particular transaction.

A separate though related problem in the prior art arises in the field of person-to-person communication. Current person-to-person mobile phone communication, including text messaging and voice, require that a person divulge their mobile phone number to other mobile phone users. While this is acceptable in some cases, it becomes unacceptable if a user wishes to allow a broader audience to contact them on their mobile phone, since no method exists to "revoke" or "un-publicize" a phone number that has been given out (e.g. on a website on the internet). Existing mobile phone person-to-person communication is extremely limited in its provisions for managing permissions for incoming messages or calls. In addition, a mobile phone user may maintain several distinct identities (such as different accounts at MYSPACE® and FACEBOOK®). The prior art makes no provision for carrying these different identities over to mobile phone communication. Finally, mobile phone communication, and text messaging in particular, provide no built-in mechanism for one-to-many and many-to-many messaging, and require custom and proprietary solutions such as the service offered by Twitter.com. The problem with services such as TWITTER™ is that they do not allow a content provider to provide a solution branded to the content provider. For example, Twitter makes no provision for allowing MYSPACE® users to broadcast messages to other MYSPACE® users using their myspace.com accounts.

These problems in the prior art suggest the need for a general, flexible, and standardized method and system which allows anyone with an internet domain name to disseminate content to mobile phone users.

Accordingly, the need remains for more versatile methods for searching for and disseminating information by mobile phones, and for providing means for conducting financial transactions using mobile phones, to address the needs of the ever growing number of mobile phone users who rely on their phones for more than merely voice communication.

SUMMARY OF THE INVENTION

According to the present invention, a method and system are provided for sending and receiving information to and from any individual, business entity, or organization with an internet domain name using messaging systems such as mobile phones with SMS text messaging.

In one aspect of the invention, a system and method are provided for communication between a communication device and a content provider associated with an internet domain name and a server. The system includes a network with a user interface for receiving concise message requests from and transmitting concise message responses to the communication device, an internet connection, and an interface to the content provider's server. A communication device user enters a concise message request which includes a channel, a designator and, optionally, a request instruction. The combination of the channel and the designator specify a location on the internet at which routing instructions reside for responding to the concise message request and generating a concise message response for output to the communication device.

In one embodiment of the invention, the communication device is a mobile phone having a short message service function and the channel is a short code corresponding to a top-level internet domain. In another embodiment, the channel provides access to the network and the designator contains the entire internet domain name. The concise message documents are written in a language referred to as Concise Message Routing Language (CMRL). Concise message documents can be generated for effecting financial transactions such as purchases and payments via SMS. CMRL can also be used to route person-to-person messaging through a content provider's internet domain at which the users may be registered.

The present invention provides a system of multi-media content organization and dissemination. A mechanism is provided by which users or entities with possibly multiply-authored content (collectively, "content providers") can disseminate their content via SMS/MMS (short message service/multimedia message service), voice, or other media on an interactive or scheduled basis to "subscribers". The system provides an intuitive interface that allows the subscribers to locate and access content that is of interest. The invention also provides a mechanism by which subscribers can be billed, a mechanism by which subscribers can send messages to other subscribers, and mechanisms for integrating advertising into the concise message content and tracking the effectiveness of the advertising.

The system and method according to the present invention achieve the above-identified goals and more by introducing a novel content organization scheme together with the concept of a "concise message request." Using these two concepts, the present invention implements a system whereby users can request content from specific content providers by addressing and sending concise message requests to the content provider from their mobile phones. Further, it allows for content from content providers to be indexed and hence searched using concise message requests not addressed directly to a particular content provider.

An important aspect of the present invention is the content organization. One embodiment of the invention provides an organizational structure for concise messaging content which replicates the internet domain name structure. In the exemplary embodiment for SMS text messaging, rather than allowing each content provider (or other entity with an internet domain) to select an SMS keyword which users can send via SMS to an SMS short code (as is typical in the related art), keywords are assigned to content providers in such a way that the short code and keyword taken together uniquely identify the internet domain name of the content provider (the "concise message request addressee"). For example, the content provider of weather news and information which operates the domain name "weather.com" could make content available when a user sends a concise message request consisting of a text message containing the word "weather" to the short code DOTCOM (corresponding to 368266 on a standard mobile phone keypad). Here, the combination of the word "weather" together with the short code DOTCOM (368266) in the concise message specifies the "address" of the concise message request and uniquely identifies the domain name weather.com.

An important aspect of the invention is the concept of using a standardized and open language to describe concise messaging services. One embodiment of the language, Concise Message Routing Language (CMRL), which may alternatively be referred to as CMML for "Concise Message Markup Language", provides a means for content providers to describe their concise message content in a way that can be independent of the media used to request and disseminate it, and in a way that can be indexed and searched. The language allows for multiple authorship of content by providing the idea of concise message redirects. These redirects instruct the system to look for content in another CMRL document, which may be managed by another content provider. CMRL together with concise message redirects form a directed graph structure of concise message content. The nature of this directed graph allows for content to be located with concise message requests by finding the most probable route through the document graph based on the content of the subscriber concise message request.

The organizational structure and system allows for concise message purchase or payment requests to be sent to the system and properly routed to the appropriate account as designated by the content provider. This organizational structure provides a solution to the problems associated with the related art regarding identifying the payee (e.g., a particular STARBUCKS® franchise) by using the inventive routing method. Specifically, the present invention enforces a one-to-one mapping between Internet domain name and concise message request address, and allows only the owner of the internet domain to specify the content returned or action taken when concise message requests are routed to the content provider. This permits, for example, only STARBUCKS®, which operates the starbucks.com domain name, to assign its franchises identifiers under the "starbucks" keyword on the short code DOTCOM (368266), and guarantees to subscribers that they are accessing the owner of the domain name "starbucks.com" when they address requests to "starbucks" at the shortcode DOTCOM (368266). In this example, STARBUCKS® might assign the identifier "store123" to a particular STARBUCKS® franchise. Subscribers could then make a payment of $4.99 to that franchise by sending the hypothetical concise message request "starbucks store123 4.99" to DOTCOM (368266).

Another aspect of the present invention provides a built-in mechanism for allowing a content provider to associate a payment with a particular transaction, without the need for a subscriber to disclose personal information. Because a transaction is initiated via concise message request by a subscriber, there is no need for the subscriber to divulge personal information (e.g., mobile phone number, email address, account name, etc.) directly to the content provider. The system provides a mechanism by which a content provider can specify a URL to be called (an "engine") when a transaction is initiated, completed, and/or terminated by the subscriber. For example, if a cashier in a store or restaurant operated by the content provider were to ring up a purchase, the cashier could then instruct the cash register to accept a payment by SMS and give the customer a corresponding purchase number. The customer could then send that purchase number via concise message addressed to the content provider via the inventive system in order make the payment. This feature, namely that of providing a concrete way to associate a payment with a particular transaction, makes the inventive system particularly useful for person-to-computer (e.g., point-of-sale) transactions.

According to the present invention, all aspects of a transaction can be handled, including: identifying the item being requested; informing the purchaser of any ambiguities in their request; informing the purchaser about the price, availability, and other information related to the items they have chosen to buy; confirming or possibly requesting billing and/or account information from the purchaser; confirming the purchase with the purchaser; debiting the purchaser's account, credit card, bank account, or other method of payment; crediting the content provider for the purchase; logging all aspects of the transaction and possibly making some or all of this information available to the purchaser, content provider, or both.

Still another aspect of the invention is to provide a means for utilizing the concise message routing system described herein to provide a mobile-phone-based person-to-person messaging system without requiring the parties to disclose their mobile phone numbers. By allowing the concise message request address to optionally include an account name associated with the domain name, users can address messages to each other using the present invention by addressing the concise message requests to the subscriber's user name at a particular domain. For example, in one embodiment of the invention, a subscriber identified by the website account subscriber1 at the MYSPACE® website myspace.com could contact a second subscriber identified by the website account subscriber2 at myspace.com by sending a concise message request addressed to "subscriber2@myspace" to DOTCOM (368266). This form of communication avoids the drawbacks of publicizing one's mobile phone number and gives the user greater control over who has access to his or her mobile phone for calls or text messages. The system allows subscribers to grant, revoke, and otherwise manage permissions related to who they wish to receive messages from, when (i.e. times of day, days of week, etc.) they wish to receive or not receive messages, and via which media (e.g. voice, SMS, e-mail, web-based account, etc.) they wish to receive the messages.

A related aspect of the invention is that the same system allows users to exchange messages on one-to-one, one-to-many, and many-to-many bases and allows the messaging system to be integrated into other, existing messaging systems, including instant-messaging systems and email. For example, in addition to the one-to-one operation described previously (one-to-one), a subscriber could contact a number of "followers" by sending a single concise message request (one to many), and many subscribers could contact a number of "followers" by sending single concise message requests (many to many). Or, for example, in one embodiment of the invention, a subscriber identified by the website account subscriber1 at the MYSPACE® website myspace.com could contact a second subscriber identified by the website account subscriber2 at myspace.com by sending a concise message request addressed to "subscriber2@myspace" to DOTCOM (368266), which could be delivered to subscribers using an instant messaging system operated by myspace.com, if myspace.com determined that subscriber2 was currently logged in to its instant messaging system. Alternatively, the message could be delivered to subscriber2 by email or otherwise handled at the discretion of myspace.com.

DETAILED DESCRIPTION OF THE INVENTION

Figure 1:
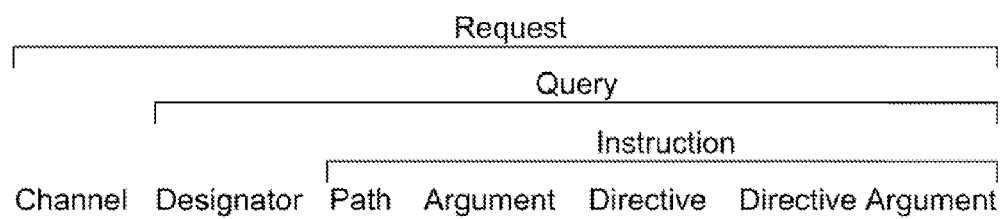
FIG. 1 is a diagram of the structure of a concise message request.

The inventive system accepts request for content from subscribers which are in the form of "concise message requests." The content returned in response to a concise message request is referred to "concise message content." Concise message content may include any combination of text, audio, video, or other multi-media content. In one embodiment, concise message requests are requests for content which have the form shown in FIG. 1. In this embodiment, concise message requests consist of a minimum of two parts, the "channel" and "designator", followed by an optional "instruction," which may consist of one or more of: a "path," an "argument," a "directive," and a "directive argument." The channel is the mechanism by which the message is received by the system. For example, if the concise message request is received as a text message sent to the short code DOTCOM, then the channel would specify DOTCOM. Alternatively, if the concise message request was spoken by a user making a voice call to the system, the channel would specify that the request was a voice request on a particular phone number. The designator is the portion of the concise message request that is used to specify the content provider to whom the message is destined. In one embodiment for text messaging, the designator is the first string of non-space characters in the body of the text message.

Taken together, the channel and the designator completely specify the "addressee" of the concise message request, which is mapped uniquely to an internet domain name. In one embodiment, the available short codes for SMS text messaging include DOTCOM (368266), DOTEDU (368338), DOTGOV (368468), DOTNET (368638), and DOTORG (368674). In this embodiment, a text message with the body "google" sent to the shortcode DOTCOM would have the channel DOTCOM, the designator "google", and would be mapped to the internet domain name "google.com". Similarly, a text message with the body "wikipedia james brown" sent to the short code DOTORG would have the channel DOTORG, the designator "wikipedia", and the instruction "james brown". In this case the channel and the designator would be mapped to the internet domain name "wikipedia.org". Finally, the text message "google.com" sent to the short code DOTEDU would have the channel DOTEDU, the designator "google.com", and would be mapped to the internet domain name "google.com". In this embodiment, if the designator explicitly specifies the top-level domain, this top-level domain takes precedence over the top-level domain associated with the channel, so that the channel solely performs the function of initiating communication with the system. Thus, while the combination of the channel and the designator provides the means for mapping the text message to the content provider google.com, the designator alone provided the complete internet domain name.

In addition, the designator can optionally specify account information associated with the domain. In one embodiment, the designator has the form "user@domain". The content provider can then specify how concise message requests with the optional account information in the designator are to be handled, on an account-by-account basis. For example, the routing instructions set up for google.com could specify that all requests with the designator "support@google" be delivered via regular e-mail to a particular e-mail address, and that all other account requests to the google domain result in an SMS text message being delivered to a particular user. The designator may include an additional character string such as "+" immediately following the domain name to denote additional functionality.

The remaining parts of the concise message request, namely the "path", "argument", "directive", and "directive argument" are discussed in more detail later in this document. It is important to note that the user may or may not be able to explicitly specify some or all of the components of a concise message request depending on the device being used to initiate the concise message request. For example, a user using the standard text messaging functionality of a mobile phone can select the channel (in this case the short code) and completely specify all other parts of the concise message request, within the limitations due to the allowable length and character set of the text message. A concise message request initiated by a custom application such as those which run on mobile devices such as the APPLE® iPhone or other mobile phones, however, could provide a richer user interface for defining the channel, designator, path, argument, directive, and/or directive argument, or could limit the possible selections for any or all of these components. The device could, for example, automatically send concise message requests to the designator "starbucks" on the DOTCOM channel, eliminating the need for the user to explicitly select that designator/channel pair.

Once the channel and the designator of a concise message request have been mapped to an internet domain name, the system consults the content corresponding to the internet domain name to further handle the request. This content is expressed in one embodiment using the Concise Message Routing Language (CMRL), alternatively referred to as CMML, which is the language used by the inventive system to describe concise message routing and content. In this embodiment, one or more CMRL documents may reside at predetermined locations on web-, ftp-, or other internet servers identified by the internet domain name. For example, the channel and designator resulting in the domain name "google.com" may result in the CMRL document "index.cmrl" located at the URL for google.com being retrieved and processed. Alternatively, the CMRL document may be retrieved from another pre-specified location, or may be retrieved from the servers of the inventive system if the content provider has previously uploaded the CMRL via a web-based content provider interface. In addition, the CMRL may be optionally encrypted.

In the exemplary embodiment, CMRL is an XML-based language that defines concise message content and routing information. One of the fundamental aspects of CMRL is the definition of a hierarchy that specifies the patterns that are expected in concise message request instructions. The hierarchy of patterns forms a CMRL document structure that is used to route an incoming concise message request to a concise message response. A CMRL document can include other CMRL documents via "redirect" statements, effectively merging the documents to form a single CMRL document structure. Redirect statements also allow for permissions related to m-commerce, advertising, and other aspects of content dissemination to be managed when documents are effectively merged. These aspects of CMRL are vital for multiply-authored content.

Key elements, nodes, and tags used in one embodiment of the CMRL language are defined as follows:

"anchor"—The anchor element defines a concise message link within concise message content. When the content is sent to the user, the anchor element is replaced with the text contained within the anchor tag, if any, followed by a number in parenthesis corresponding to the reply the user should send to follow the link. When the user replies with this link text, the terminating node in the anchor is evaluated.
For example:

```
<match pattern="">
    <message>
        <content>Read <anchor>our blog<rss href="http://www.example.com/rss.xml"/></anchor></content>
    </message>
</match>
```

This example will send the message "Read our blog(1)" to the user. If the user replies with the message "1", then they will be sent the result of the RSS tag (i.e. a listing of the stories in the RSS feed).

"a"—The a element is a shortcut for an anchor tag that evaluates a query. The query attribute specifies the query to execute if the link is followed. For example:

```
<match pattern="">
    <message>
        <content>Get help on <a query="example.com help">Example</a>.</content>
    </message>
</match>
```

In this example, the message will be displayed as e.g. "Get help on Example(1)." If the user responds to the number corresponding to the link (1 in this example) then the query "example.com help" is executed as if the user had entered the text directly.

"block"—The block element is a terminating node that allows various "helper" tags to be associated with another terminating node. A block must contain exactly one terminating node, but can contain additional CMRL nodes as well, including zero or one keywords tag or zero or more set tags. A block allows a terminating match to execute more than one statement. For example, the following match:

```
<match pattern="vote">
    <block>
        <keywords>
            <keyword>red</keyword>
            <keyword>blue</keyword>
        </keywords>
        <set name="voted">1</set>
        <engine ref="http://www.example.com/cgi-bin/vote" />
    </block>
</match>
``` results in an engine being called after the set and keywords have been evaluated.

"br"—The br element specifies a line break.

"cmrl"—The cmrl tag is the root tag for CMRL documents.

"content"—The content node is contained in a message and specifies the content of a message.

"engine"—The engine element is used to call an external program (i.e., CGI script). The only requirement of an external engine program is that it prints out exactly one terminating node. The engine tag must contain the attribute href which specified the URL of the engine.

"follow"—The follow tag allows a user to register their phone number to a query as a "follower." Users who are registered as followers of a query will receive the argument of incoming concise message requests that result in the query and that include a "+" immediately following the designator. For example, a user who is following the query "facebook partyline" would receive the message "hello" when the concise message request "facebook+partyline hello" is routed. Similarly, a user following the query "news@myspace" would receive the message "No news today" when the concise message request "news@myspace+ No news today".

"forward"—The forward tag specifies that the argument of a concise message request be sent to the user who has registered to the corresponding register tag of the query. In addition, the forward tag also sends the argument of the query to all followers of the query if a "+" is present immediately following the designator in the concise message query (see the follow tag).

"get"—The get element is used to insert the contents of a session variable (which are set either with set or an input). For example:

```
<match pattern="welcome">
    <message>
        <content>Welcome <get name="first_name"/> <get name="last_name"/>!</content>
    </message>
</match>
```

If, e.g., set had been used to set the variable first_name to "Eduardo" and the variable last_name to "Geming a", then this message might be sent to the user as "Welcome Eduardo Geminga!"

"input"—The input element provides a way for obtaining an arbitrary response from the user and optionally storing it in a session variable. The name attribute specifies the name of the variable to be set, and the terminating node inside the input specifies where the result of the input should be sent. For example, the match

```
<match pattern="login">
    <message>
        <content>Reply with your first name.</content>
        <input name="full_name">
            <engine href="http://example.com/cgi-bin/login.cgi" />
        </input>
    </content>
    </message>
</match>
``` sends the message "Reply with your first name." to the user. The next message the user sends is interpreted as input and will be used to set the variable "full_name". Finally, in this example, the engine will be called, and the result will be sent to the user.

"keyword"—The keyword tag defines an allowable keyword for a block. Keywords are enclosed in a keywords tag. Keywords specify how a concise message argument should be corrected before executing the terminating node in a block. This is discussed in more detail below. Keywords must be enclosed in a keywords tag.

"keywords"—The keywords tag is a container for keyword tags.

"m-buy"—The m-buy tag is a terminating node that allows a CMRL document to specify items which an end user can purchase. The m-buy tag and its child tags are discussed in more detail in the "Mobile Commerce" section below.

"m-pay"—The m-pay tag is a terminating node that allows a CMRL document to specify that a payment can be made from the end user to the content provider. This can be used to allow the end user to pay for services rendered, or to e.g. make a point-of-sale purchase. The m-pay tag and its child tags are discussed in more detail in the "Mobile Commerce" section below.

"match"—The match tag provides the fundamental structure of CMRL. A match tag defines a pattern which is to be matched to an incoming concise message request. For example, the following CMRL fragment:

```
<match pattern="john smith">
   <message><content>My name is John Smith.</content></message>
</match>
``` specifies that a token matching "john smith" in the incoming concise message request will result in the response "My name is John Smith." A match tag can only contain either additional match tags or exactly one terminating node. For example,

```
<match pattern="john smith">
   <match pattern="">
      <message><content>My name is John Smith.</content></message>
   </match>
   <match pattern="office">
      <message><content>My office is located in room 233.</content></message>
   </match>
</match>
```

This CMRL fragment specifies that the query "john smith" will still return "My name is John Smith", but the query "john smith office" will now return the response "My office is located in room 233."

Special allowable match patterns are " " (the null match, corresponding to no additional tokens in the query), and "*" (the default match, corresponding to a match if no other suitable match is found. In addition, a special match pattern can be specified to match designator account information. For example, the match

```
<match pattern="stefan@">
   <message><content>Stefan is on vacation</content></message>
</match>
``` could be used to match the account information "stefan@" in the designator "stefan@domain". Similarly, the match

```
<match pattern="*@">
   <engine href=http://example.com/accounts.cgi />
</match>
``` could be used to match any account specified as part of the designator, and to retrieve the response or request fulfillment information from an engine.

If the loose attribute is not set to "0" (or if it is omitted), the CMRL parser will use a loose parsing algorithm to match queries in a flexible way. For example, if the match pattern is "john smith", then the interpreter might match "john", "jsmith", "js", or "jon", if these can be unambiguously identified with the pattern. Note that match patterns which are to be used for, e.g., passwords should have loose set to 0 so that they must be matched exactly.

"message"—The message tag is a terminating element used to define a message which is sent to the user. A message must have exactly one content tag, and optionally may include zero or one input elements to read a response from the user. The message element is a terminating node.

"query"—The query element is a terminating node. It can be used to return the result of executing another query, or can be placed in an anchor or input to specify the destination query for the user input. The query tag must contain a text string, which is the query to be executed.

"redirect"—The redirect tag allows a CMRL document to include the contents of another CMRL document.

"register"—The register tag allows a phone number (or other user contact identifier, such as e-mail address) to be associated with a particular query. A query can have only one registered phone number. A registered user will receive messages sent via forward tags located in the terminating node of the query.

"rss"—The rss tag is a terminating node used to return an RSS feed as a formatted message. Possible attributes include href story, and link. The href attribute specifies the http destination of the RSS feed. If neither story nor link are specified, rss returns a menu of the stories in an RSS feed as a message. The story attribute is a 1-based index corresponding to the item tags in the feed. If story is specified then the corresponding item is returned as a message. If link is specified, then the links in the RSS feed for the RSS stories are displayed. If both link and story are specified, then the link corresponding to the story is pushed via a WAP push to the phone. Depending on the phone, this may result in the story automatically opening in the phone's web browser, if supported.

"set"—The set element sets a session variable. The attribute name specifies which session variable is to be set. A session variable can be unset by using a set with no value.

"url"—The url tag is used to replace a URL with a shortened SMS-safe version. For example, the following message:

```
<message><content>For more information visit
<url>http://www.example.com/sdflj/~lksdfd?bsdf=123032-123322-
123132&prod=39482342&output=2342341234</
url></content></message>
``` would result in a message such as

For more information visit http://dotgo.com/2vrb3f

When the end user accesses the resulting URL they will be automatically redirected to the URL specified in the url tag. It is recommended that all URLs be encoded in this way, for several reasons: (1) some URLs contain characters (such as ~) which are not present in the default GSM 7-bit alphabet (and hence may be stripped); and (2) this tag produces URLs that are preferentially not split between messages.

The structure and processes for adding content and fulfilling concise message requests for content are shown in FIG. 1, which provides a block diagram of an exemplary implementation of the inventive system 100. As illustrated, a content provider 102 accesses the content provider interface 106 via a distributed network, e.g., the internet 104. The content provider interface 106 provides a mechanism for content providers to interact with the system. For example, they can manage their account information, upload CMRL documents, create CMRL documents using CMRL front-end tools, define pricing for content, manage and pay media usage fees, and handle all other aspects of content creation and dissemination. After content is published (either directly via CMRL upload or via the content provider interface CMRL front-end tools), it is added to the CMRL database. Any events that are to be disseminated on a schedule are added to the event database 118.

For dealing with subscription content, the Event Handler 120 periodically polls the event database 118 to determine if scheduled events need to be acted upon. If an event needs to be acted upon, the Event Handler 120 queries the Subscriber Database (DB) 116 to determine which subscribers the event applies to, queries the User Profile DB 130 to read user delivery preferences (such as excluding certain times of day), and creates a message for each user and sends it to the Formatting Module 150.

Content that is meant to be accessed interactively (or "on-demand") is made available to the Request Handler 114 via the CMRL database 108. When a concise message request is received by the Concise Message Interface 122 via SMS, email, voice, or other medium, it is converted from the requesting medium to a standard format, a top-level query pattern is prepended as will be described below, and the message is passed to the Request Handler 114. The Request Handler 114 accesses the User Profile Database 130 to determine previous request history for this and other users, and then constructs a CMRL document graph (e.g. FIG. 4). The Request Handler 114 then matches the request to the complete document graph using a matching algorithm that takes into account misspellings in the request, alternate orderings of the request tokens, user preferences, and usage history. If the result is sufficiently ambiguous, the Request Handler 114 sends a response to the Formatting module 150 with instructions for how the user can disambiguate the request. If the result returns a sufficiently probable result but other results are also likely, the Request Handler 114 sends a message to the Formatting Module 150 containing the result of the most probable route along with suggested alternatives. If no match is found, a corresponding message is sent to the Formatting Module for delivery to the end user.

If the request route on the document graph results in a URL, RSS feed, or other web service, the Request Handler 114 retrieves the content from the internet server 124 specified by the match. This match may be cached to improve performance (e.g., for RSS feeds). If the match results in an engine (a web-based CGI script), the system executes, calls the engine, and evaluates the resulting CMRL. (Engines must return a terminating node, so when the system calls an engine it gets CMRL (a terminating node) in response, and evaluates that terminating node.)

The Formatting Module 150 first passes the message to the Customization Module 132, which customizes the message based on the user profile contained in the User Profile DB 130. For example, the message might contain a special tag <get name="firstname">, which the Customization module 132 will replace with the first name of the user. Or, it might contain a special tag <function name="dusk">, which the Customization Module 132 will replace with the calculated time of local dusk in the user's zip code. If the message contains any advertising tags, the Customization Module 132 retrieves an advertisement from the Advertising Module 134 before customizing the message. In this way, the advertisement can be customized for the end user. The advertisement is selected from the Advertisement DB 136 based on user profile information, such as location, user preferences, usage history, etc.

The Formatting Module 150 then takes the customized message and formats it into the appropriate medium taking into account user preferences. The preferences might include, for example, maximum text message length for SMS or the type of voice to use when synthesizing the message for audio dissemination. If the message refers to any special multimedia (e.g., an audio file for audio dissemination, or an image for email dissemination), the formatter retrieves these from the Media DB 140. When the Formatter 150 has finished formatting the message, it is passed on to the Concise Message Interface 122 for delivery to the end user.

Figure 3:
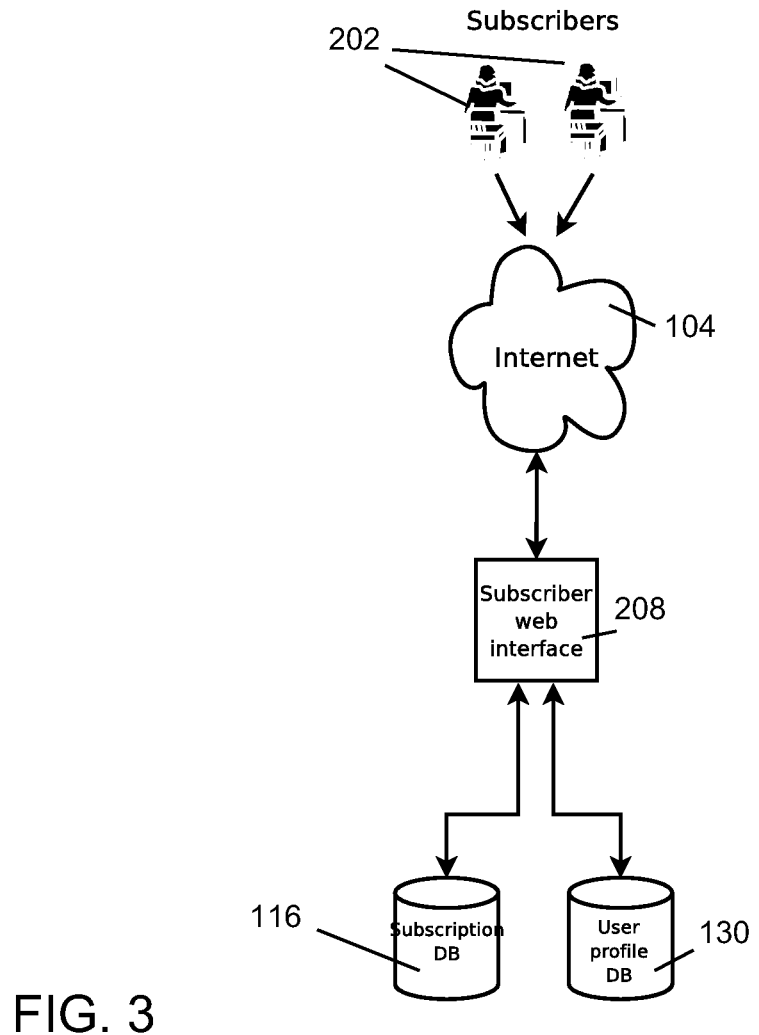
FIG. 3 is a block diagram of one embodiment of the subscriber web interface.

Subscribers 202 are also able to manage their account information via the web (accessible directly over the internet, or via a mobile device supporting WAP, the Wireless Application Protocol). FIG. 3 illustrates one example of such a Subscriber Web Interface. The Subscriber Web interface 208 allows the user to view and manage their subscriptions in the Subscription DB 210, and edit their profile information, edit their billing information, and review and possibly dispute any billing transactions posted to their account stored in the User Profile DB 212.

EXAMPLE 1

CMRL Document Structure

Figure 4:
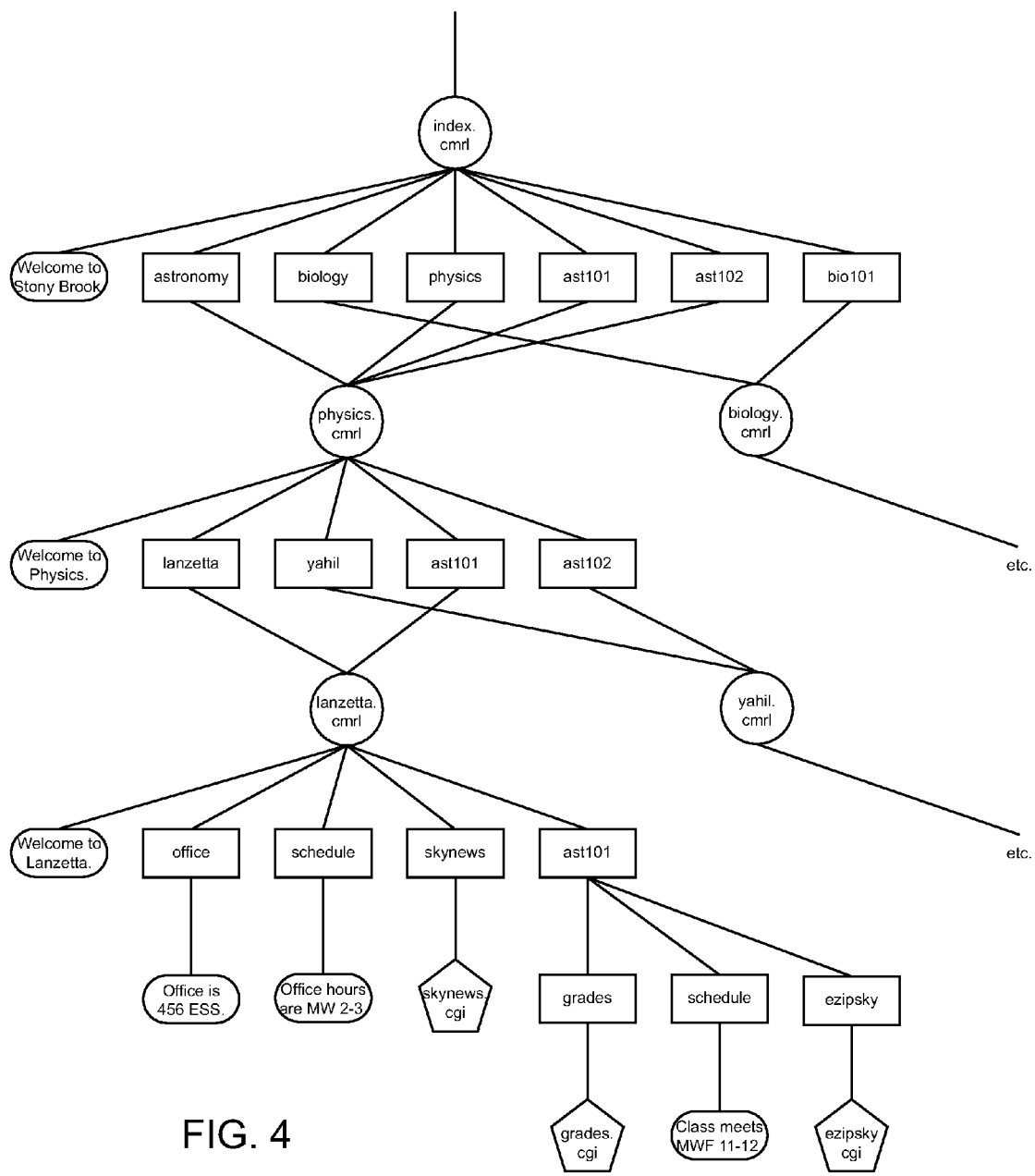
FIG. 4 is an exemplary CMRL document graph according to the present invention.

FIG. 4 provides an example of a CMRL document structure. In FIG. 4, circles represent CMRL documents, rectangles represent match patterns, rounded rectangles represent messages, and pentagons represent engines. A match pattern is a sequence of one or more characters (possibly including punctuation or spaces) that are matched to a concise message request path. An engine is a web-based application program (which can accept optional arguments). It is apparent from FIG. 4 that messages and engines are terminating nodes of a CMRL document structure.

A concise message request is routed considering (1) the request, (2) a CMRL document structure, (3) user preferences, and (4) usage history. Based on these factors, the response to the request may instruct the user that no match was found, an exact match was found, a probable match was found (possibly with other probable matches), or too many matches were found.

As a concrete example, consider the document "index.cmrl" and the other documents hosted by the internet domain "stonybrook.edu," and consider the request "stonybrook" on the "DOTEDU" short code with respect to the CMRL document structures of FIG. 4. Because the request was received via the "DOTEDU" short code, the system examines the CMRL document "index.cmrl" at the internet domain "stonybrook.edu." This document contains seven entries: one terminating with the message "Welcome to Stony Brook," four linking the match patterns "astronomy," "physics," "ast101," and "ast102" to the document "physics.cmrl," and two linking the match patterns "biology" and "bio101" to the document "biology.cmrl." Because the request matches no match patterns, the system resolves under the "null match" to the message "Welcome to Stony Brook."

Next consider the request "stonybrook astronomy lanzetta office" on the "DOTEDU" short code. As in the previous example, the system examines the CMRL document "index.cmrl" at the internet domain "stonybrook.edu," but now the system matches the match pattern "astronomy" in the "stonybrook" document, which links to the document "physics.c- mrl" The system next examines the document "physics" and matches the match pattern "lanzetta," which links to the document "lanzetta.cmrl"

The system next examines the document "lanzetta" and matches the match pattern "office," which terminates on the message "Office is 456 ESS." The system returns the message "Office is 456 ESS."

Next consider the request "stonybrook office" on the "DOTEDU" short code. As in the previous two examples, the system examines the CMRL document "index.cmrl" at the internet domain "stonybrook.edu," but the system cannot match any match pattern in the "index.cmrl" document. Because the entire CMRL structure is available, the system searches the structure for a match to the match pattern "office." Such a match is found only in the document "lanzetta.cmrl," which terminates on the message "Office is 456 ESS." The system again returns the message "Office is 456 ESS."

What if the match pattern "office" is not unique under the "stonybrook" portion of the CMRL structure, e.g. what if the match pattern "office" appears in the document "yahil" as well as in the document "lanzetta"? In this case, the system appeals to user preferences and usage history to attempt to remove the ambiguity and determine the best route based on probability. For example, if the user has a history of accessing the match pattern "lanzetta" and no history of accessing the match pattern "yahil," then the system ascribes higher probability to the match pattern "lanzetta office" and lower probability to the match pattern "yahil office" and returns the concise message "Office is 456 ESS. Found under lanzetta office. Respond[1] for more." If the user has no history of accessing either match pattern "lanzetta" or "yahil," the system returns the concise message "Two results found. Respond [1] for lanzetta and [2] for yahil." In this way, the system allows users to abbreviate requests.

Next consider the request "stonybrook ast101 grades exam1 1234" on the "DOTEDU" short code. As in the previous examples, the system routes this request along "stonybrook astronomy lanzetta ast101," which links to the match patterns "grades," "schedule," and "ezipsky." The system matches the match pattern "grades," which terminates on the engine "grades.cgi." The system passes the request (i.e., "stonybrook ast101 grades exam1 1234") and a tokenized version of the request (i.e., "stonybrook," "ast101," "grades," "exam1," and "1234") to the URL specified by the engine. The URL returns a response to the system (presumably the grade on exam1 received by the student of identification number 1234), and the system returns this response.

Next consider the request "stonybrook ezipsky 11787" on the "DOTEDU" short code. As in the previous examples, the system routes this request along "stonybrook astronomy lanzetta ast101." The system matches the match pattern "ezipsky," which terminates on the engine "ezipsky.cgi" The system passes the request (i.e., "stonybrook ezipsky 11787") and a tokenized version of the request (i.e. "stonybrook," "ezipsky," and "11787") to the engine. The engine returns a response to the system (presumably information about the night sky in zip code 11787), and the system returns this response.

Match patterns are probabilistically matched to requests in a way that allows for possibilities of misspellings and possibly (in one embodiment) out-of-order arrangement. For example, the match patterns of the document structure of FIG. 4 might be matched to the misspelled request "stonybook astronomy lanzetta office" and the out-of-order request "stonybrook astronomy office lanzetta" in the same way they are matched to the request "stonybrook astronomylanzetta office."

The follow code listing provides the CMRL of the example document lanzetta.cmrl described in FIG. 4.

```
<cmrl>
    <match pattern="">
        <message>
            <content>Welcome to Lanzetta.</content>
        </message>
    </match>
    <match pattern="office">
        <message>
            <content>Office is 456 ESS.</content>
        </message>
    </match>
    <match pattern="schedule">
        <message>
            <content>Office hours are MW 2-3.</content>
        </message>
    </match>
    <match pattern="skynews">
        <engine href="http://stonybrook.edu/cgi-bin/skynews.cgi">
    </match>
    <match pattern="ast101">
        <match pattern="grades">
            <engine href="http://stonybrook.edu/cgi-bin/skynews.cgi">
        </match>
        <match pattern="schedule">
            <message>
                <content>Class meets MWF 11-12.</content>
            </message>
        </match>
        <match pattern="ezipsky">
            <engine href="http://stonybrook.edu/cgi-bin/ezipsky.cgi">
        </match>
    </match>
</cmrl>
```

The following examples describe an implementation of the inventive system:

EXAMPLE 2

The System

An embodiment of the present invention has been published via the World Wide Web under the name "DOTGO™". To use DOTGO™, the mobile phone user sends a text message starting with an internet domain name to the phone number DOTCOM (368266)—or to one of the phone numbers DOTEDU (368338), DOTGOV (368468), DOTNET (368638), or DOTORG (368674), as appropriate. A simple three step operation is:

1. Compose a new text message to the phone number 368266, which spells out "D-O-T-C-O-M" on most mobile-phone keypads.
2. Type the internet domain name "cnn" as the body of the message.
3. Send the message. A response should appear within a few seconds.

In this case, the response is a list of news topics from cnn.com. The user can reply with the text message "1" to select the first topic, "Top Stories." The response is a list of stories within "Top Stories" from cnn.com. Replying with the text message "1" selects the first story, "2" selects the second story, etc.

As another example, texting "nytimes" to the phone number DOTCOM (368266) produces a response of a list of news stories from nytimes.com. The stories can then be browsed as in the previous example.

Many services also accept additional input, allowing a user to specify exactly what information is sought. For example, texting "wikipedia dog" to the phone number DOTORG (368674) provides information about dogs from wikipedia.org. Or the user can text "weather"+the local zip code to the phone number DOTCOM (368266) to obtain the latest weather forecast for a specific area from weather.com. In another example, the user can text "ezipsky"+the zip code+a celestial object in the night sky (such as the name of a planet, star, or constellation) to the phone number DOTCOM (368266) to get up-to-the-minute instruction on how to see that celestial object from ezipsky.com.

DOTGO™ utilizes the principles of the invention described above: the first word of the message specifies the internet domain name, and the phone number specifies the top-level domain. Broadly speaking, DOTGO™ replicates the organizational structure of the internet, however, the information offered by DOTGO™ is generally a subset of the information available on the internet—the subset that is most useful and relevant in a mobile setting. Text messages are short, allowing the user to quickly send and receive small amounts of information using a mobile phone. In essence, DOTGO™ is as an extension of the internet to mobile-phone text messaging.

EXAMPLE 3

DOTGO Sample Document 1

This following example describes the DOTGO™ system from the perspective of a publisher seeking to implement a mobile service.

For a content provider who owns an internet domain name and has the authority to customize the content returned by DOTGO™ under that internet domain name begins by placing a file called "index.cmrl" onto the root directory of its web server. The file index.cmrl contains instructions that describe how to distribute content via mobile-phone text messaging, much as a file "index.html" contains instructions that describe how to distribute content via the web. These instructions can simple or sophisticated to perform operations including returning static or dynamic content, providing or collecting information, selling or buying products, etc.

The instructions contained in the file index.cmrl are written in CMRL which has been described previously. CMRL plays the same role to DOTGO™ that HTML plays to the internet—it describes content. The difference is that CMRL is specifically designed to "route" the short queries and responses that are appropriate to mobile phone text messaging. The concise structure makes it ideal for describing content that is intended to be accessed in a mobile setting, where slow data transfer rates often make browsing the internet on a mobile phone browser a frustrating experience.

If there is no file index.cmrl, DOTGO™ seeks to render the file index.html as well as possible within the limitations of mobile phone text messaging. For example, any page that references one or more RSS feeds is rendered in such away as to make those RSS feeds available. Other times, the result may be less useful. But this feature ensures that DOTGO™ will always provide some type of response to any request for any internet domain name. In fact, DOTGO™ will respond with something to any request for any URL.

The advantages of DOTGO™ over other methods of implementing a separate mobile service, e.g., by obtaining a dedicated or shared short code, are substantial: (1) a content provider can instantly carry over the brand name recognition of its internet domain name to its mobile service. If users know where to find the content provider on the internet, they will know where to find them using DOTGO™. (2) The content provider saves money because there are no setup fees, no monthly fees, and no per-message fees. (3) The content provider does not need to purchase or maintain expensive hardware—the mobile service runs on the DOTGO™ servers. (4) The content provider can immediately take advantage of the DOTGO™ software infrastructure to compose innovative mobile content.

Consider the following CMRL document:

```
<?xmlversion="1.0" encoding="UTF-8"?>
<cmrl xmlns:dotgo="http://dotgo.com/cmrl/1.0">
    <match pattern="*">
        <message>
            <content>Hello world!</content>
        </message>
    </match>
</cmrl>
```

Looking at the document, line by line:
Line 1: <?xml version="1.0"encoding="UTF-8"?>
This line indicates that the document is an XML document, which is necessary because CMRL is a variety of XML. An opening line like this is required of any XML document and hence of any CMRL document.
Line 2: <cmrl xmlns:dotgo="http://dotgo.com/cmrl/1.0"
This line indicates that the document is a CMRL document. A line like this is required of any CMRL document.
Line 3: <match pattern="*">
This line introduces the match tag, which is a fundamental aspect of CMRL. A match specifies a pattern against which the query is compared to determine how the query is to be routed or resolved. In this case, the match pattern is the "default" match pattern (represented by the wild-card character "*") and there are no other match patterns specified in the document, so any query that is presented to the document will satisfy this match.
Line 4: <message>
This line introduces the message tag, which is another fundamental aspect of CMRL. Every terminating match must contain one (and only one) terminating node, of which a message is the simplest example. A message must contain content (i.e., the body of the message) and may in addition contain other constructs.
Line5: <content>Hello world!</content>
This line contains the content of the message. In this case, the content is the simple text string "Hello world!" enclosed by the opening <content> and closing </content> tags.
Line6: </message>
This line closes the <message> tag opened in line 4.
Line7: </match>
This line closes the <match> tag opened in line 3.
Line8: </cmrl>
This line closes the <cmrl> tag opened in line To install the document, the content provider transfers the document to the root directory of its web server, i.e., to the same directory that contains the root "index.html" of its website. The document should be named "index.cmrl" and permissions should be set to allow appropriate access to the document.

To validate the document, the content provider sets its web browser to http://dotgo.com/support/cmrlvalidator/ and enters its domain name into the input box under "Validate by URI". Clicking the button "Validate" should produce a response indicating that the index.cmrl file is valid. If not, the document should be checked to confirm that it exactly matches the above listing, that the document is named "index.cmrl," and that permissions are set to allow appropriate access to the document.

The final step is to test the document, which involves texting the internet domain name to the phone number DOTCOM (368266)—or to one of the phone numbers DOTEDU (368338), DOTGOV (368468), DOTNET (368638), or DOTORG (368674) as appropriate. For example, to access the internet domain "example.com," text "example" to the phone number DOTCOM (3682266). The response should be "Hello world!"

To achieve this result, the system used the first word of the query "example" and the phone number DOTCOM (368266) through which the query was received to determine that the query should be routed to example.com. Next, the system retrieved the file index.cmrl from example.com. Finally, the system compared the remainder of the query (i.e., everything after "example," which in this case was an empty string) against the match patterns specified in the file index.cmrl in order to resolve the query. In this case, there was only one match pattern specified in the file index.cmrl—the default match pattern—which resolved to the message "Hello world!" returned by the system.

EXAMPLE 4

DOTGO™ Sample Document 2

The following provides another example of a procedure by which a content provider can create a document using the DOTGO™ system for accessing content on their website:

Consider the following CMRL document:

```
<?xml version="1.0"encoding="UTF-8"?>
<cmrl xmlns:dotgo="http://dotgo.com/cmrl/1.0">
  <match pattern="">
    <message>
      <content>Welcome to the DOTGO example.</content>
    </message>
  </match>
  <match pattern="red">
    <match pattern="circle">
      <message>
        <content>You have selected a red circle.</content>
      </message>
    </match>
    <match pattern="square">
      <message>
        <content>You have selected a red square.</content>
      </message>
    </match>
  </match>
  <match pattern="green">
    <match pattern="circle">
      <message>
        <content>You have selected a green circle.</content>
      </message>
    </match>
  </match>
  <match pattern="engine">
    <engine href="http://dotgo.com/cgi-bin/examples/current_time.cgi"/>
  </match>
  <match pattern="rss">
    <rsshref="http://dotgo.com/support/documentation/example2/example.rss"/>
  </match>
```

```
  <match pattern="*">
    <message>
      <content>Nothing relevant here.</content>
    </message>
  </match>
</cmrl>
```

After entry, the document is saved as "index.cmrl," installed and validated as described in the previous example.

Using as an example the internet domain "example.com," the query "example" produces the response "Welcome to the DOTGO example." The system again used the first word of the query "example" and the phone number DOTCOM (368266) through which the query was received to determine that the query should be routed to example.com. The system again retrieved the file index.cmrl from example.com, and compared the remainder of the query (which was again an empty string) against the match patterns specified in the file index.cmrl to resolve the query. In this case, the empty string was matched to the "null" match pattern (i.e., the empty string), which resolved to the message "Welcome to the DOTGO example."

The query "example red circle" produces the response "You have selected a red circle." In this case, the second token of the query is matched to the match pattern "red," and the third token of the query is matched to the match pattern "circle," so the match is unambiguous.

The query "example circle" produces the response "Did you mean 'red circle' (1) or 'green circle' (2)?" In this case, the second token of the query is matched to the lower-level match pattern "circle" but is ambiguous between the higher-level match patterns "red" and "green," so the match is ambiguous, and the system seeks to resolve the ambiguity.

This query also illustrates the "hyperlink" feature of DOTGO™. In reply to the above response, the query "1" is equivalent to the query "example red circle." Similarly, the query "2" is equivalent to the query "example green circle." In this case, the hyperlinks were generated automatically by the system, although CMRL allows arbitrary hyperlinks to be specified.

The query "example square" produces the response "You have selected a red square." In this case, the second token of the query is matched to the match pattern "square," skipping the higher-level match pattern "red" since the match to "square" is unambiguous.

Both the queries "example grean cirkel" and "example gc" produce the response "You have selected a green circle." In these cases, the queries are matched to the match patterns "green" and "circle." In general, the system seeks to obtain matches using phonetics and abbreviations as well as by direct comparison (although it is possible to turn this feature off, requiring exact matches).

The query "example engine" produces a response similar to "It is 9:18 UTC on Apr. 12, 2008." (but with the current time and date). In this case, the query is matched to the match pattern "engine," which terminates in an "engine" tag that references a cgi program running on the DOTGO™ servers. An engine is any web-based application program and can return arbitrary output in response to arbitrary input. Here, the engine simply returns the current time and date.

The query "example rss" produces the response "DOTGO News and Blog. Reply (1) for latest news entry and (2) for latest blog entry." In this case, the query is matched to the match pattern "rss," which terminates in an "rss" tag that references RSS feeds hosted on the DOTGO™ servers.

The query "example encyclopedia" produces the response "Nothing relevant here." In this case, the query does not match any of the specified match patterns so it is matched to the default match pattern. A document does not need to have a default match, but, in general, it is a good idea to include one to handle queries that cannot otherwise be resolved.

The framework described above can be used to write rich content: by, for example, adding arbitrary matches, nesting matches within matches, and returning dynamic content using the <engine> and <rss> tags. In addition, arbitrary hyperlinks can be designated and user input can be accepted. "Session variables," which store information on a per-user basis can be set and requested, and "keywords" can be specified to "correct" user input to a list of standard tokens. The elements are described and illustrated in the following examples.

EXAMPLE 5

Keywords

Keywords in CMRL are used to "correct" user input to a list of standard tokens that are somehow "expected" under a particular match. Keywords provide means for handling the misspellings, abbreviations, and other ambiguities that often are quite common in text-message input.

To illustrate, an engine is implemented under the internet domain name "example" and the match "travel" related to travel between the major east-coast cities Boston, New York, Philadelphia, and Washington, D.C. Taking a pair of these cities as arguments, the engine might be referenced by the following CMRL fragment:

```
<match pattern="travel">
    <engine href="http://example.com/cgi-bin/travel.cgi"/>
</match>
```

A possible query might be
    example travel New York Washington, D.C.
The problem is that there could be many other queries that express exactly the same intention, including for example
    example travel new york Washington, d.c.
    example travel new yorke washingtun, d.c.
    example travel ny wash
    example travel nyc dc
In other words, the problem is that the query might contain misspellings and abbreviations, which must be handled in order to make the engine useful in practice.

One approach is to handle all possible misspellings and abbreviations in the engine, however, a more practical way is to obtain matches using phonetics and abbreviations as well as by direct comparison, to "correct" other user input to a list of standard tokens. The feature is implemented using the <keywords> and <keyword> tags within the <block> tag. For example, the keywords "Boston," "New York," "Philadelphia," and "Washington, D.C." could be associated with the engine described above by the following CMRL fragment:

```
<match pattern="travel">
    <block>
        <keywords>
            <keyword>Boston</keyword>
            <keyword>New York</keyword>
```

```
            <keyword>Philadelphia</keyword>
            <keyword>Washington, D.C.</keyword>
        <keywords>
        <engine href="http://example.com/cgi-bin/travel.cgi"/>
    </block>
</match>
```

With this construction, the engine would be passed "New York" and "Washington, D.C." for all of the queries discussed in section 2. The query
    example travel los angeles seattle
would not be corrected, and the engine would be passed "los," "angeles," and "seattle." The query
    example travel los angeles nyc
would be partially corrected, and the engine would be passed "los," "angeles," and "New York."

The <block> tag is a CMRL terminating node that allows various "helper" tags to be associated with another terminating node. The <block> tag must contain exactly one terminating node (which in this case is the <engine> tag) and may contain various other tags, including zero or one <keywords> tags (and zero or more <set> tags, which are beyond the scope of this document). The <keywords> tag may contain zero or more <keyword> tags, which list standard tokens that are somehow "expected" under a particular match.

The system posts the corrected argument as the parameter "sys_corrected_argument." The system posts the known (because they are successfully matched to a keyword) corrected tokens as the parameters "sys_corrected_argument_known[n]" (where n is a zero-based index) and the number of such tokens as the parameter "sys_num_corrected_argument_known." The system posts the unknown (because they are not successfully matched to a keyword) corrected tokens as the parameters "sys_corrected_argument_unknown[n]" and the number of such tokens as the parameter "sys_num_corrected_argument_unknown." And the system posts the (known and unknown) corrected tokens (together in the original order) as the parameters "sys_corrected_argument[n]" and the number of such tokens as the parameter "sys_num_corrected_argument."

It is important to note that keywords persist. For example, starting with the following CMRL fragment:

```
<match pattern="colors">
    <block>
        <keywords>
            <keyword>red</keyword>
            <keyword>green</keyword>
            <keyword>blue</keyword>
        <keywords>
        <engine href="http://example.com/cgi-bin/colors.cgi"/>
    </block>
</match>
```

If this CMRL fragment were to be replaced with the following CMRL fragment

```
<match pattern="colors">
    <engine href="http://example.com/cgi-bin/colors.cgi"/>
</match>
``` as long as the first CMRL fragment was accessed at least once, the keywords "red," "green," and "blue" set in the first CMRL fragment would persist.

This feature allows keywords to be set in either a CMRL document or an engine. For example, another way to set the keywords described in the first CMRL fragment described above would be to have the engine referenced in that fragment return the following CMRL fragment:

```
<block>
    <keywords>
        <keyword>red</keyword>
        <keyword>green</keyword>
        <keyword>blue</keyword>
    <keywords>
    <message>
        <content>Thanks for selecting one of red, green, or blue</content>
    </message>
</block>
```

In this case, the keywords "red," "green," and "blue" would be set the first time the engine was called and would persist until changed or cleared. Keywords are associated with (or stored with respect to) a terminating node of a CMRL document.

Such a feature is useful because it would be cumbersome to list such a large number of keywords in some huge CMRL file. Similarly, it would not be practical for the engine to return such a large number of keywords every time it was called. The solution is to have the engine return the keywords only when specifically directed, for example, in response to a "reset" request. For example, the following CMRL fragment could be inserted into the CMRL document:

```
<match pattern="reset">
    <engine href="http://example.com/cgi-bin/cities.cgi?mode=reset"/>
</match>
```

The engine would return the following CMRL fragment in response to a reset request

```
<block>
    <keywords>
        <keyword>Aaronsburg</keyword>
        <keyword>Abbeville</keyword>
        <keyword>Abbotsford</keyword>
        .
        .
        .
        <keyword>Zwolle</keyword>
    <keywords>
    <message>
        <content>Keywords have been reset</content>
    </message>
</block>
```

The keywords can be kept up to date by calling the engine with a reset request any time the keywords returned by the engine are modified.

To clear all keywords, an empty <keywords> tag, i.e., a <keywords> tag that contains no <keyword> tags, can be used.

EXAMPLE 6

Session Variables

Session variables in CMRL are used to store information on a per-user basis (e.g., user preferences, usage history, account identification, etc.). Session variables are similar to cookies on the web: they make it easy to customize services for individual users.

To illustrate, if one were to implement an engine under the internet domain name "example" and the match "weather" that returns a weather forecast based on zip code, the engine might be referenced by the following CMRL fragment:

```
<match pattern="weather">
    <engine href="http://example.com/cgi-bin/weather.cgi"/>
</match>
``` where "weather.cgi" is a web-based CGI program that returns a weather forecast given a zip code. The first time a particular user accesses the service, the user must provide a zip code. For subsequent queries to this service, the zip code can be set to default to the previous value by using session variables. Session variables are used to store information—like zip codes—on a per-user basis. Suppose the web-based CGI program "weather.cgi" consists of the following Perl program (together with some unspecified function "forecast" that returns a weather forecast given a zip code):

```
#!/usr/bin/perl
use CGI qw(:standard);
use strict;
$argument =~ m/(\d\d\d\d\d)/;
my $current_zip_code = $1;
my $argument = param("sys_argument");
my $last_zip_code = param("last_zip_code");
my $content;
if ($current_zip_code) {
    $content = forecast($current_zip_code);
    $last_zip_code = $current_zip_code;
} elsif ($last_zip_code) {
    $content = forecast($last_zip_code);
} else {
    $content = "Please supply a five-digit zip code--try again";
}
print header;
print <<EOF
<block>
    <set name="last_zip_code">$last_zip_code</set>
    <message>
        <content>$content</content>
    </message>
</block>
EOF;
```

With this construction, the previous value of the zip code, if there is one, is stored in the session variable "last zip code." The first time a particular user accesses the service, the query "example weather" produces the response "Please supply a five-digit zip code—try again," whereas the query "example weather 90210" produces a weather forecast for zip code 90210 as a response. Once a zip code is specified, the next and subsequent times the same user accesses the service, the query "example weather" produces a weather forecast for zip code 90210 as a response.

Using this construction, the session variable "last zip code", if it exists, is posted to the engine every time the engine is called. The engine assigns the value of the session variable "last zip code" to the Perl variable "$last zip code" in the line my $last_zip_code=param("last_zip_code");
of the Perl program. If no zip code is supplied, and if there is a previous value of the zip code, then the engine uses the previous value of the zip code to produce the weather forecast. The engine sets the value of the session variable "last zip code" every time it is called using the <set> tag within the <block> tag. The <block> tag is a CMRL terminating node that allows various "helper" tags to be associated with another terminating node. The <block> tag must contain exactly one terminating node (which in this case is the <message> tag) and may contain various other tags, including zero or more <set> tags (and zero or one <keywords> tags, which are beyond the scope of this document). The <set> tag must contain the attribute name, which is the name of the session variable to be set (in this case "last zip code"), and must contain a text string, which is the value to be assigned to the session variable (in this case the value of the Perl variable "$last zip code").

Session variables are stored per user and per CMRL document. When a particular user accesses a particular CMRL document, all session variables defined for that user and that CMRL document are available to the CMRL document (and are posted to engines referenced by the CMRL document).

The <get> tag is used to get the value of a session variable from within CMRL. Using the following CMRL fragment under the scenario described above:

```
<match pattern="show default">
    <message>
        <content>Default zip code: <get name="last_zip_code"/></content>
    </message>
</match>
```

Under this construction, if the session variable "last zip code" does not exist, then the query "example show default" produces the response "Default zip code:," whereas if the session variable "last zip code" exists, the query "example default" produces the response "Default zip code: 90210."

The <input> tag can be used to set the value of a session variable. Using the following CMRL fragment under the internet domain name "example":

```
<match pattern="name">
    <message>
        <content>Reply with your first name</content>
        <input name="first_name">
            <message>
                <content>Thanks <get name="first_name"/></content>
            </message>
        </input>
    </message>
</match>
```

Under this construction, the query "example name" produces the response "Reply with your first name." The reply "Sally" then produces the response "Thanks Sally." The <input> tag is used within a <message> tag. The <input> tag must contain exactly one terminating node (which in this case is another <message> tag) and may contain the attribute name, which is the name of the session variable to be set. If a <message> tag contains an <input> tag, then the reply sent by the user is treated differently than normal; in particular, it is passed directly to the terminating node of the <input> tag as an argument. If the terminating node of the <input> tag is a <message> tag, then the reply has no effect (since a <message> tag cannot interpret an argument). However, if the terminating node of the <input> tag is an <engine> tag, the reply is passed directly to the engine as an argument, with no other processing by the system. In this way, the <input> tag can be used to direct arbitrary user input to an engine. If the name attribute of the <input> tag is specified, then the value of the session variable specified by the name attribute is set to the reply. In this way, the <input> tag can be used to store arbitrary user input in a session variable.

Two or more <input> tags can be nested, allowing multiple session variables to be set sequentially. For example, consider the following CMRL fragment:

```
<match pattern="name">
    <message>
        <content>Reply with your first name</content>
        <input name="first_name">
            <message>
                <content>Now reply with your last name</content>
                <input name="last_name">
                    <message>
                        <content>Thanks <get name="first_name"/> <get name="last_name"/></content>
                    </message>
                </input>
            </message>
        </input>
    </message>
</match>
```

Under this construction, the query "example name" produces the response "Reply with your first name." The reply "Sally" then produces the response "Now reply with your last name." The reply "Jones" then produces the response "Thanks Sally Jones."

EXAMPLE 7

Anchors

Anchors in CMRL are used to establish links to content. Anchors are similar to anchors on the web in that they make it easy to create a way for users to navigate a content hierarchy.

To illustrate, the following CMRL fragment under the internet domain name "example" is used:

```
<match pattern="">
    <message>
        <content>Welcome to example. com<br/>
Reply # for result<br/>
<a query="example circle"/> Circle<br/>
<a query="example square"/> Square<br/>
<a query="example triangle"/> Triangle</content>
    </message>
</match>
<match pattern="circle">
    <message>
        <content>You have selected a circle</content>
    </message>
</match>
<match pattern="square">
    <message>
        <content>You have selected a square</content>
    </message>
</match>
<match pattern="triangle">
    <message>
        <content>You have selected a triangle</content>
    </message>
</match>
```

Here the query "example circle" produces the response "You have selected a circle," the query "example square" produces the response "You have selected a square," and the query "example triangle" produces the response "You have selected a triangle." The query "example" produces the response:
  Reply # for result
  (1) Circle
  (2) Square
  (3) Triangle The query "example" followed immediately (in the very next text message) by the reply "1" produces the response "You have selected a circle." Similarly, the query "example" followed by the reply "2" produces the response "You have selected a square," and the query "example" followed by the reply "3" produces the response "You have selected a triangle."

The "null" match contains a <message> tag that contains a <content> tag that contains three <a> tags. The <a> tag is used within a <content> tag. The <a> tag must contain the attribute query and may contain a text string. The system turns the <a> tags within a <content> tag into links, which it enumerates, formats, and displays. If a <content> tag contains an <a> tag, then the reply sent by the user is treated differently than normal. In particular, if the reply matches one of the enumerated links, the query specified by the corresponding <a> tag is executed as though it were an incoming request. (If the reply sent by the user does not match one of the enumerated links, it will be treated as a normal query.)

The <a> tag is an abbreviated version of the similar but more general <anchor> tag. The following CMRL fragment under the internet domain name "example" is used to illustrate:

```
<match pattern="weather">
    <message>
        <content>Today sunny, H 72<br/>
Reply <anchor>
    <message>
        <content>Today will be sunny and fair with a high of 72 deg F</content>
        <message>
</anchor> for details<br/>
<br/>
Tonight clear, L 47<br/>
Reply <anchor>
    <message>
        <content>Tonight will be clear and cool with a low of 47 deg F</content>
        <message>
</anchor> for details</content>
        </message>
</match>
```

Here the query "example weather" produces the response:
  Today sunny, H 72
  Reply (1) for details
  Tonight clear, L 47
  Reply (2) for details
The reply "1" produces the response "Today will be sunny and fair with a high of 72 deg F.," whereas the reply "2" produces the response "Tonight will be clear and cool with a low of 47 deg F."

Like the <a> tag, the <anchor> tag is used within a <content> tag, and the system turns the <anchor> tags within a <content> tag into links which it enumerates, formats, and displays. The difference between the <a> tag and the <anchor> tag is that the <a> tag can refer only to a query whereas the <anchor> tag can refer to any CMRL terminating node. Specifically, the <anchor> tag must contain exactly one terminating node (which in this case is the <message> tag), which is resolved to if the reply matches the corresponding enumerated link.

To be further illustrate the similarity between the <a> tag and the <anchor> tag, the following CMRL fragment under the internet domain name "example" is used:

```
<match pattern="">
    <message>
        <content>He was able to <a query="example elucidate">elucidate</a>
the subject</content>
        </message>
</match>
<match pattern="elucidate">
    <message>
        <content>elucidate -verb<br/>
to make lucid or clear; throw light upon; explain</content>
        <message>
    </match>
``` is equivalent to the following CMRL fragment under the internet domain name "example"

```
<match pattern="">
  <message>
    <content>He was able to <anchor><query>example elucidate</query>elucidate</anchor> the subject</content>
    </message>
</match>
<match pattern="elucidate">
  <message>
     <content>elucidate -verb<br/>
  to make lucid or clear; throw light upon; explain</content>
     <message>
</match>
```

In both cases, the query "example" produces the response:
  He was able to elucidate (1) the subject
The reply "1" produces the response
  elucidate—verb to make lucid or clear; throw light upon; explain In summary, by establishing links to specific content, anchors make it possible to create a way for users to navigate a content hierarchy.

EXAMPLE 8

Implementing a DOTGO™ Engine

A DOTGO™ engine is a web-based application program that accepts input from DOTGO™ and returns output to DOTGO™. Engines can be used to create dynamic mobile services, connecting DOTGO™ to the internet, databases, and other computer-based services. Because an engine is a web-based application program, it can be written in any web programming language (e.g. Perl, PHP, Java, Python, etc.)—the only condition on an engine is that it must accept input in a specified format and must return output in a specified format.

Again utilizing the hypothetical mobile service implemented under the internet domain "example.com", the mobile service is accessed by sending a text message starting with the internet domain name "example" to the phone number DOTCOM (368266) for which CMRL files and web-based application programs are hosted at the internet domain "example.com."

Consider the following CMRL document:

```
<?xml version="1.0" encoding="UTF-8"?>
<cmrl xmlns:dotgo="http://dotgo.com/cmrl/1.0">
    <match pattern="something">
        <engine href="http://example.com/cgi-bin/something.cgi"/>
    </match>
</cmrl>
``` and the following Perl program:

```
#!/usr/bin/perl
use CGI qw(:standard);
use strict;
my $color = param("sys_argument");
my @red_things = ("Apples", "Lips", "Hearts");
my @green_things = ("Frogs", "Shamrocks", "Olives");
my @blue_things = ("Jeans", "Blueberries", "Blue jays");
my $thing;
if ($color eq "red") {
    $thing = $red_things[int(rand($#red_things+1))];
} elsif ($color eq "green") {
    $thing = $green_things[int(rand($#green_things+1))];
} elsif ($color eq "blue") {
    $thing = $blue_things[int(rand($#blue_things+1))];
}
my $content;
if ($thing) {
    $content = "$thing are $color";
} else {
    $content = "Try red, green, or blue";
}
print header;
print <<EOF
<message>
    <content>$content</content>
</message>
EOF
;
```

The query "example something red" produces one of the responses (at random) "Apples are red," "Lips are red," or "Hearts are red." Similarly, the query "example something green" produces one of the responses "Frogs are green," "Shamrocks are green," or "Olives are green," and the query "example something blue" produces one of the responses "Jeans are blue," "Blueberries are blue," or "Blue jays are blue." The query "example something yellow" produces the response "Try red, green, or blue."

This result is obtained by accessing the service by sending the text message "example something red" to the phone number DOTCOM (368266). First, the system uses the first word of the query "example" and the phone number DOTCOM (368266) through which the query is received to determine that the query should be routed to example.com. Next, the system retrieves the file index.cmrl from example.com. Next, the system compares the remainder of the query (i.e., everything after "example," which in this case was the string "something red") against the match patterns specified in the file index.cmrl in order to resolve the query. In this case, there is only one match pattern specified in the file index.cmrl—the match pattern "something", which is matched by the first token "something" of the string "something red" and which resolves to the <engine> tag. Next, the system calls the engine something.cgi referenced by the <engine> tag, posting the remainder of the query (i.e., everything after "something," which in this case is the string "red") to the engine as the parameter "sys_argument." The engine uses the value of the parameter "sys argument," which it assigns to the variable "$color," to construct the response, which is assigned to the variable "$content." Finally, the engine prints the value of the variable "$content" within a CMRL <message> tag, which produces the message "Apples are red" (or similar) returned by the system.

A number of points may be observed from this example:

1. The request is made up of several distinct parts: one part (in this case, the phone number DOTCOM (368266) plus "example") designates the internet domain that hosts the index.cmrl file, one part (in this case "something") designates the path that is compared against the match patterns specified by the CMRL document, and one part (in this case "red") designates the argument that is passed to the engine.

2. There is no explicit delimiter between the path and the argument. The request must be routed by the system (by comparison to some CMRL document) in order to determine which portion of the request is the match and which part of the request is the argument.

3. The argument is posted to the engine as the parameter "sys argument." Other parameters are also posted to the engine (as described below).

4. The engine returns a CMRL "terminating node," of which the <message> tag is the simplest example.

In summary, DOTGO™ engines work by the following process: the system extracts an argument from the request by comparing the request against the match patterns specified in some CMRL document, the system posts the argument (and other parameters) to the engine, and the engine returns a CMRL terminating node.

The nomenclature of the structure of a request is illustrated in FIG. 1. A request is the fundamental unit of interaction with DOTGO™. A request is made up of a channel and a query. A channel is a specification of the physical device through which the request was received. For purposes of this description, a channel is one of the phone numbers DOTCOM (368266), DOTEDU (368338), DOTGOV (368468), DOTNET (368638), or DOTORG (368674). A query is a text string sent by a user. A query is made up of a designator and an optional instruction. A designator is the first word of a query. A designator is either an internet domain name (with or without an explicit specification of a top-level domain) or a URL. The channel and the designator together specify the location of a CMRL file. An instruction is the remainder of the query (after the designator). An instruction is made up of an optional path, an optional argument, an optional directive, and an optional directive argument. A path is a portion of a query that is matched to match patterns specified in a CMRL file. A path is made up of one or more match patterns (which may contain spaces). An argument is the portion of the query after the match and before the directive. An argument includes one or more keywords (which may contain spaces). A directive is a DOTGO™ reserved word. In version 1.0 of CMRL, the DOTGO™ reserved words are "follow", "unfollow", "register", "unregister", "stop", "subscribe", and "unsubscribe". A directive argument is the remainder of the query (after the directive). A directive and a directive argument are handled by the system and are never passed to an engine.

As one concrete example, consider the directive "subscribe". This directive allows a user to initiate the creation of a subscription to a query via concise message request, via the subscriber web interface, or via a content provider website or application which accesses the inventive system through an internet-based application programming interface (API). After the subscribe request has been made, the user is contacted via concise message requesting confirmation of the subscription. Upon affirmation of the request by the user, a subscription is created. Once a subscriber has been subscribed to a query, the query is executed periodically, on a schedule or condition specified by the directive argument. For example, a request of the form "starbucks news subscribe mwf 9 am eastern" to the short code DOTCOM would request confirmation from the user, and upon successful confirmation would result in the query "starbucks news" being executed every Monday, Wednesday, and Friday at 9 am Eastern Standard Time. Similarly, the request "starbucks news subscribe daily 5:30 pm" would result in the same query being executed every day at 5:30 pm. Finally, the request "starbucks news subscribe on update" would result in the query being executed and the response sent to the user every time the concise message content returned as a result of the query for that user is changed. The directive argument for the directive "subscribe" can specify a variety of time or condition specifications, including time intervals, specific times and dates, time functions (such as "dusk"), content conditions (such as "on update"), or other intentions for periodic specification.

Separation of the path from the argument can only be done by comparing the request against the match patterns specified in some CMRL document. In other words, what portion of the request will be posted to an engine depends on what portion of the request is matched to match patterns specified in the CMRL document.

In the example described above (with the colored items), the argument was posted to the engine through the parameter "sys_argument." Other parameters that can be posted to an engine are listed in Table 1:

TABLE 1

| Parameter | Description |
| --- | --- |
| sys_query | Query |
| sys_argument | Argument |
| sys_designator | Designator |
| sys_location | Location |
| sys_num_known_keywords | Number of matched and corrected keywords |
| sys_known_keyword[n] | Matched and corrected keywords |
| sys_num_unknown_keywords | Number of unmatched and uncorrected keywords |
| sys_unknown_keyword[n] | Unmatched and uncorrected keywords |
| sys_num_keywords | Number of matched and unmatched keywords |
| sys_keyword[n] | Matched and unmatched keywords (in order) |
| sys_match | Match |
| sys_num_patterns | Number of matched patterns |
| sys_patterns[n] | Number of matched patterns |
| Session variables | Session variables |

An engine returns a CMRL "terminating node," of which the <message> tag is the simplest example. In version 1.0 of CMRL, there are five CMRL terminating nodes: the <message> tag, the <engine> tag, the <rss> tag, the <block> tag, and the <query> tag, each of which has been described previously in the listing of key elements.

The framework described in this and the preceding examples can be use to write rich content using CMRL. Additional matches can be included, and matches can be nested within matches. Dynamic content can be returned using the <engine> and <rss> tags.

Mobile Commerce

Figure 2:
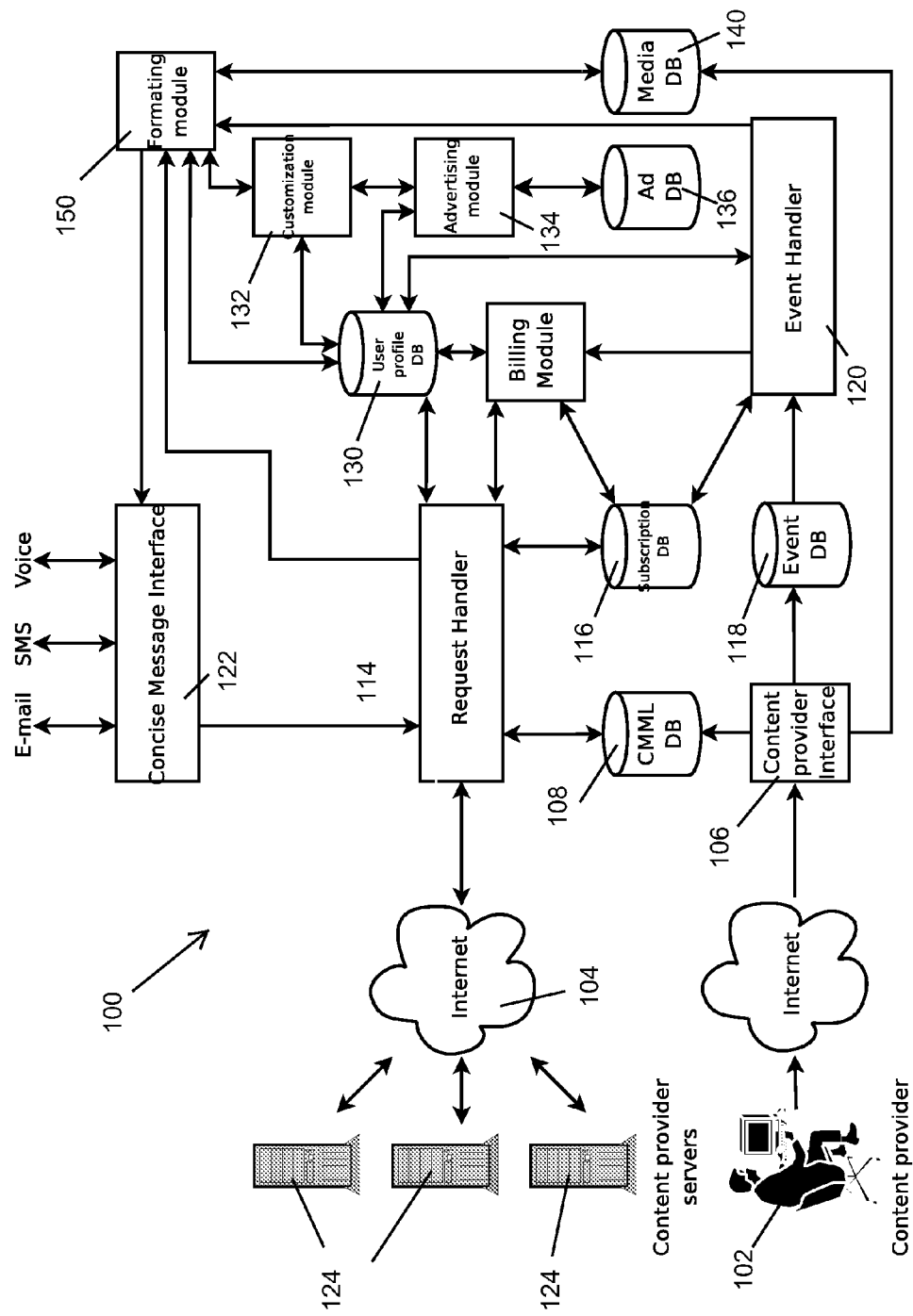
FIG. 2 is a block diagram of one embodiment of the content provider interface and content fulfillment portions of the invention.

The inventive system also includes provisions that allow content providers and end users to conduct mobile commerce, i.e., "m-commerce." Transactions including "m-buy", i.e., buying an item through the user's mobile phone using CMRL, and "m-pay", i.e., conducting a transfer of funds using CMRL and a user's mobile phone, can be accomplished using the inventive system over a network such as the one illustrated in FIG. 2.

The structure of the inventive system is such that concise message purchase or payment requests sent to the system can be properly routed to the appropriate account as designated by the content provider. This organizational structure provides a solution to the problems associated with existing systems such as PAYPAL® regarding identifying the payee (e.g., a particular STARBUCKS® franchise) by using the inventive routing method. Specifically, the present invention enforces a strict mapping between concise message request channel/designator pair and internet domain name, such that only the owner of an internet domain name can manage the corresponding domain name CMRL and hence determine the account(s) used for m-commerce. In this way end users are guaranteed that their concise message request is being routed to the owner of a particular domain name.

For example, STARBUCKS®, the owner of the domain starbucks.com, has complete and unambiguous control over the CMRL file located at the starbucks.com URL. Only the owner of the domain starbucks.com can create and manage this CMRL file. In one embodiment of the inventive system, the owner of starbucks.com is also the unambiguous owner of the designator/channel pair "starbucks" at the text messaging short code DOTCOM. In this embodiment, all concise message requests with the designator/channel pair "starbucks" at DOTCOM are routed and fulfilled considering the CMRL filed "index.cmrl" contained located at the URL for starbucks.com. This in and of itself solves one of the problems of the related art, namely, how to unambiguously identify the payee of a transaction. In addition, because STARBUCKS® controls the CMRL that is used to fulfill requests with the designator/keyword pair "starbucks" at DOTCOM, it is able to assign store numbers in their top-level CMRL document to STARBUCKS® franchises as it sees fit, addressing another problem of the related art, namely the ambiguity of assigning and managing ownership of keywords. In this model, a user might send the concise message request via text message: "starbucks 332 buy grande latte". The query would be routed to the starbucks.com's CMRL document, which might have an entry "332" redirecting to the CMRL of STARBUCKS® store number 332. This CMRL document would then describe all the items that can be purchased at STARBUCKS® store 332, along with their prices, taxable status, and ordering options (e.g., "grande") using an m-buy CMRL tag. In this way, the owner of starbucks.com (namely, the company STARBUCKS®) has complete control (via their top-level CMRL document) over how they choose to route all requests that are addressed to the designator/channel pair "starbucks" at DOTCOM, which includes the ability to delegate requests to the appropriate franchises.

Another aspect of the present invention provides a built-in mechanism for allowing a content provider to associate a payment with a particular transaction, without the need for a subscriber to disclose personal information. Because a transaction is initiated via concise message by a subscriber and sent to the inventive system, there is no need for the subscriber to divulge personal information, e.g., mobile phone number, email address, account name, etc., to the content provider. The inventive system provides a mechanism by which a content provider can specify a URL to be called (an "engine") when a transaction is initiated, completed, and/or terminated by the subscriber. For example, if a cashier were to ring up an order for someone at a STARBUCKS® cafe, the cashier could then instruct the cash register to accept a payment by SMS and give the customer a corresponding purchase number. The customer could then send that purchase number via concise message addressed to the STARBUCKS® cafe (i.e., the content provider) via the inventive system in order make the payment. For example, the customer might text the query "starbucks.com 332 194F56", where 332 is the store number and 194F56 is the purchase number given to the customer by the cashier.

The system, if instructed by the CMRL of STARBUCKS® store 332, could then query a URL over the Internet or other network to request price and transaction information associated with the purchase number 194F56. The transaction and price could then be confirmed and completed by the customer. When the user has completed the transaction, the final details of the transaction can be sent to the URL, which could allow, e.g., the cash register to mark the payment as accepted. This feature, namely that of providing a concrete way to associate a payment with a particular transaction, makes the inventive system particularly useful for person-to-computer, e.g., point-of-sale, transactions.

The present invention allows for two classes of functionality to be expressed in a computer language: "m-buy", and "m-pay" (for "mobile-buy" and "mobile-pay"). An "m-buy" language block allows a content provider to define items that users can purchase. A content provider can author an "m-buy" block in a computer text file (i.e. CMRL file) to define the items that are for sale as well as options that are available for the items. These options may or may not affect the cost of the item, such as whether it is taxable, or its size, color, etc. The present invention makes use of a system including hardware and software to interpret these CMRL files (preferably over a network) and make the items available by concise message request over one or more media. A user can send a concise message request (e.g., by mobile phone SMS text message) requesting an item. According to the present invention, all aspects of the transaction can be handled, including: identifying the content provider "m-buy" block and item being requested; informing the purchaser of any ambiguities in their request; informing the purchaser about the price, availability, and other information related to the items they have chosen to buy; confirming or possibly requesting billing and/or account information from the purchaser; confirming the purchase with the purchaser; debiting the purchaser's account, credit card, bank account, or other method of payment; crediting the content provider for the purchase; logging all aspects of the transaction and possibly making some or all of this information available to the purchaser, content provider, or both.

An "m-pay" language block allows a content provider to define a more general concise message payment. This may be used when the content provider does not desire to define specific items for sale as in an "m-buy" block, or does not know the price of a transaction in advance. For example, an "m-pay" block might be used to allow a mobile user to pay an invoice as rung up on a cash register, to send a donation to a charity where the user specifies the amount to donate, or more generally to send an arbitrary amount of money to the content provider. An "m-pay" block can include a reference to a URL which can be used to query the price of a transaction and which is used to signal successful completion or termination of the transaction. For example, this URL could be used to inform a cash register after a payment has been made. Note that an "m-pay" block could be used by a content provider to implement a person-to-person method of payment.

Mobile commerce transactions enabled by the present invention are illustrated by the following examples.

EXAMPLE 9

M-Commerce—Purchase Transaction

The following code listing provides a hypothetical example of an m-buy (mobile-buy) block expressed in CMRL as it might be implemented for the starbucks.com domain. This file could be uploaded to the inventive system's servers and associated with the starbucks.com domain, or it could be named "index.cmrl" and placed in the root web directory of the starbucks.com internet server.

```
<cmrl>
  <match pattern="">
    <message><content>Welcome to Starbucks. Text a store number,
      "buy", and some items to make a purchase.<br />
      Ex: "buy 332 small coff sgr lf mlk"</content></message>
  </match>
  <match pattern="332">
    <match pattern="location|address">
      <message><content>Starbucks store 332 is located at 123 Main
Street, Cambridge, MA, 02139.</content></message>
    </match>
    <match pattern="buy">
      <m-buy account="starbucks332" taxrate="0.085">
        <item pattern="coffee" taxable="1">
          <style pattern="small" price="1.99" />
          <style pattern="large" price="2.99" default="1"/>
            <options>
              <option pattern="sugar" />
              <option pattern="regular milk" />
              <option pattern="low fat milk" />
            </options>
        </item>
      </m-buy>
    </buy>
  </match>
</cmrl>
```

In this example, the content provider has defined a "null match" pattern which responds with the message, 'Welcome to Starbucks. Text a store number, "buy", and a brief description of the desired items to make a purchase. Ex: "buy 332 small coff sgr lf mlk"'. This "null match" is returned when the query routed to this file has no additional tokens, namely the query "starbucks" or "starbucks.com". In this example the content provider has also defined a match to the pattern "332". Within the "332" match, the content provider has defined two additional match patterns: "location|address", and "buy". The "|" operator specifies that the match pattern should match a query that contains either the token "location" or the token "address". For example, both queries "starbucks 332 location" and "starbucks 332 address" would result in the message "Starbucks store 332 is located at 123 Main Street, Cambridge, Mass., 02139" being sent to the user. In addition, the queries "starbucks address" and "starbucks location" would also result in the same response message, since the system uses an algorithm which allows for match levels to be skipped ("332" in this case) when possible. The queries "starbucks addr", and "starbucks 332 lcn" would also result in the same message, since the matching and routing algorithm used by the system takes into account partial and phonetic matches, abbreviations, removal of punctuation, and acronyms.

The second match in the above code listing under the "332" match pattern matches the query pattern "buy", and terminates with an m-buy block instead of a message. This m-buy block defines the account, which has been created in one embodiment via a content provider web interface in the inventive system, which is to be credited with the payment ("starbucks332") and the tax rate to be applied for the sale (8.5%). It is important to note that this account name ("starbucks332") is completely hidden from the user, and that the payee is specified by the user via a concise message request which is routed to the m-buy block (and hence account) of the payee through a well-defined hierarchy ultimately administered by the internet domain name owner.

The m-buy block may include additional information needed for the sale as well, such as shipping information or per-state tax information. The m-buy block in the above code listing includes a single item for sale, "coffee", which is defined to be taxable (i.e., the tax rate will be applied). Two "styles" of coffee are available in this example: "small", for a price of $1.99, and large, for a price of $2.99. Styles specify mutually exclusive qualifiers for the item. In this example, the queries "starbucks 332 buy small coffee" and "starbucks 332 buy coffee small" would both result in an order for a small coffee. The query "starbucks 332 buy large small coffee" would result in an error, since "large" and "small" are both styles and hence can not appear together for a single item. Finally, because the "large" style is marked as default, the query "starbucks 332 buy coffee" is equivalent to "starbucks 332 buy large coffee".

The <options> tag in the example code listing allows for additional options to be added to an item. In this example, three options are defined: "sugar", "regular milk", and "low fat milk". Unlike styles, options are not mutually exclusive and more than one can appear in a query.

When a query that terminates in an m-buy block is sent to the inventive system, the system first determines whether the user can be billed by searching its database(s) for billing information for that user such as a credit card number, bank account number, or other credit information through which a transfer of funds can be effected for payment. If a user query is successfully matched to items in an "m-buy" block and the user does not have billing information on file, the user is instructed to supply their billing information, either via a website, by SMS, by phone, or by another medium. If the user does have billing information on file, the system sends the user a confirmation message, such as "Your order totals $2.16. Reply [1] to confirm your order from STARBUCKS® 332 for: small coffee sugar low fat milk." If the user confirms this message (e.g., by replying "1"), the user's account that is on file in the system is debited for the cost of the order. The complete order information along with a system assigned transaction ID is then delivered to the content provider using delivery options specified in the merchant account identified with the "account" attribute of the m-buy tag ("starbucks332" in this example). This might include e-mail delivery, Internet IP delivery (e.g., via an HTTP "POST" or "GET"), or other method. This delivery method and/or destination and/or other delivery details can also be optionally specified in the m-buy block itself. An order completion message is sent to the user which includes a transaction ID. The confirmation message could read, for example, "You have completed your purchase and your order has been sent to STARBUCKS® 332. Your transaction ID is 2D38484." The user can then present this transaction ID at STARBUCKS® store 332 to receive their order. Note it is also possible for an m-buy block to specify that the payment can or must be made using another method such as at the point-of-sale or via the internet instead of debiting the user's account information stored in the inventive system.

EXAMPLE 10

M-Commerce: Purchase Transaction

The following code listing provides another example of a CMRL document that uses an m-buy block to sell pizza for take-out from a UNO CHICAGO GRILL® restaurant, i.e., a nearby location of a restaurant chain. This example could be used by either uploading it to the inventive system's servers, or by putting it in the file "index.cmrl" at unos.com, i.e., the general web site of the Pizzeria Uno Corporation. This action would make it immediately available by SMS via one or more short codes, by voice via one or more phone numbers, and possibly by other media including email via one or more email addresses.

```
<cmrl>
    <match pattern="">
        <message><content>Welcome to Pizzeria Uno. Text a store number or location you'd like to pick up your order at and what you'd like to buy.</content></message>
    </match>
    <match pattern="456|&location_near('11790', 8, '56 Main Street')">
        <m-buy account="unos456" taxrate="0.085">
            <item pattern="pizza" taxable="1">
                <style pattern="small" price="10.99">
                    <options>
                        <option pattern="pepperoni" price="1.00" />
                        <option pattern="anchovies" price="1.00" />
                    </options>
                </style>
                <style pattern="large" price="12.99" />
                    <options>
                        <option pattern="pepperoni" price="2.00" />
                        <option pattern="anchovies" price="2.00 />
                    </options>
                </style>
            </item>
        </m-buy>
    </match>
</cmrl>
```

In this example, the query "unos" or "unos.com" would result in the null match welcome message: "Welcome to Pizzeria Uno. Text a store number or location you'd like to pick up your order at and what you'd like to buy." The second match pattern matches, for example, the query "unos 456". The second match also demonstrates the use of a dynamic function for matching a query to a response. Namely, the function "location_near", designated as a function in this embodiment with the "&" sign, is considered to match a query if the query contains any string that can be interpreted as a location, and that location is determined to be within 8 miles from the zip code 11790. In this example the third argument to the function "location_near" gives a name to be presented to the user in order to disambiguate the query if more than one match pattern were to match (e.g., the message "Did you mean "56 Main Street" or "88 Pine Street"?). This type of function allows for sophisticated matching and for the easy extension of CMRL.

The above code listing also provides an example of allowing different option blocks within each style. This allows for different options per style, or different option attributes per style, such as price. In this example, the query "unos 456 small pizza pepp" would result in an order for a pizza with the style "small" and with the option "pepperoni", totaling $13.01 ($11.99 plus tax). Note that styles can contain additional styles, allowing for multiple mutually-exclusive qualifiers e.g., "large deep dish pizza".

EXAMPLE 11

M-Commerce: Payment Transaction

The following code listing provides an example of an m-pay (mobile-pay) block as expressed in a hypothetical CMRL document for the Red Cross (redcross.org).

```
<cmrl>
    <match pattern="">
        <message><content>Welcome to the Red Cross SMS site. Text
"donate" to donate.<br />Ex: "redcross donate 15"<br />
        Or, text "donate" and a cause to donate to a specific
charity.<br/>
        Ex: "redcross donate tsunami"</content></message>
    </match>
    <match pattern="donate">
        <m-pay account="redcross" />
    </match>
    <match pattern="invoice">
        <m-pay account="redcross" href="http://redcross.org/cgi-
bin/inv"/>
    </match>
</cmrl>
```

In this example, the null match returns the welcome message "Welcome to the Red Cross SMS site . . . " This would be returned in response to a concise message request with no argument to designator/channel pair, e.g., "redcross" to the text messaging short code DOTORG or "redcross.org" to any text messaging short code. The second match pattern, matching "donate", contains an m-pay block. This m-pay statement instructs the system to credit the account named "redcross" with the amount included in the query from the user. For example, if a user sent the query "redcross donate 15" to the system, the system would route the query to this m-pay statement. If the user is not billable, as described above, the system responds with a message instructing the user to supply their billing information via the web, text message, voice, or other method. If the user is billable, the system responds with a message such as "Reply [1] to confirm your payment of $15 to the redcross.org". If the user responds with the query "1", then the system debits the user's account $15 and credits the system account named "redcross" with $15 (possibly deducting a transaction service fee from the amount debited). The user then receives a message confirming the payment including a transaction ID, such as "You have sent a payment of $15. Your payment ID is 5F3489." As with m-buy, the complete transaction details are also sent to the content provider, using the content details stored in the account "redcross" (or using the contact details if specified directly in the m-pay block).

The third match pattern (for "invoice") in the code listing shows an example of retrieving payment information dynamically from the content provider. In this example, the query "redcross.org invoice 8U8348" is routed to the m-pay block under the "invoice" match pattern. If the user is not billable, the user is instructed to provide billing information, as described above. If the user is billable, the system queries the script of the invoice directory for the Red Cross URL with the parameter "8U8348" to retrieve pricing and other information given the parameter "8U8348". The transaction is completed using the price and other information returned by the script in a manner similar to that described in the previous example. This functionality permits a number of operations, including allowing a user to make a purchase at a content provider's store, obtain an invoice number, and pay this invoice directly from their mobile phone without divulging their mobile phone number, account number, or other contact information to the cashier. It should be noted that this dynamic querying of m-commerce information can also be used in an m-buy block (e.g., for querying item price or item availability).

Both the m-buy and m-pay blocks may default to the currency of the user, but can also support additional currencies. For example, a user could query "redcross.org donate 12 EUR" to pay 12 Euros to redcross account.

EXAMPLE 12

DOTGO™ Messaging

Currently, person-to-person cell phone text messaging has a number of limitations:
1. Once a cell phone number has been made public, it cannot be retracted and made private again
2. A cell phone number that has been given out can be texted to (or called) by anyone, not just by those to whom it was explicitly given.
3. A cell phone number that has been given out can be texted to (or called) at any time of the day.
4. A cell phone number represents a single identity; there is no concept of allowing text messages only from friends, or only from co-workers.

These limitations make many people reluctant to share their mobile phone numbers with anyone other than a family member, friend or trusted business associate, and can particularly make people reluctant to publish their cell phone numbers on a website.

The system according to the present invention provides a solution to the foregoing problems in a way that builds directly on the fundamental organizational structure of the system. This feature is characterized by the following aspects of the DOTGO™ system:

1. The possibility for the concise message request designator to optionally include account information, such as with the syntax user@domain.

2. The following three constructs of CMRL: register, forward, and follow

These two aspects of CMRL allow a content provider to quickly and easily define accounts and enable messaging between their users. This permits users to easily contact each other via mobile phone text messaging by sending messages such as "joe@example Hows it going?" to DOTCOM. The messaging component of the inventive system includes the following features:

1. Account definition: Details of the user account at a domain are completely specified by the content provider in the CMRL of the SMS site. Content providers can add a functioning user account to their domain for text messaging in seconds by adding one to three simple language tags.

2. Privacy: Users can register their mobile phone numbers to an account only through concise message requests to the inventive system. The numbers are not shared with a content provider and users can unregister at any time.

3. Permissions: User- and domain-based white- and blacklists are supported. For example, a user at facebook.com could choose to block a specific FACEBOOK® user from texting them, could choose to allow only specific friends or groups of friends to text them, or could choose to block all messages from facebook.com.

4. One-to-many texting: Users can choose to "follow" another user, receiving all messages sent by that user. This allows websites such as example.com to implement their own micro-blogging services (similar to that offered by Twitter.com, a service for friends, family, and co-workers to communicate and stay connected through the exchange of quick, frequent messages).

5. Many-to-many texting: Users can choose to "follow" a "public" query. Messages sent to that query by its followers are distributed to all other followers, in effect providing a text messaging-based chat room.

6. Message routing: Users can choose to route messages to their phone, or can choose an alternate method of delivery such as e-mail, an instant messaging account, or another destination offered by the content provider (e.g., delivery as a message to their FACEBOOK® messaging account). In addition, message routing preferences can be set to block or allow receipt of messages at specified times of day, days of the week, or another time specifications.

The messaging features provided by CMRL create a tighter integration between person-to-person text messaging and the internet and allow text messaging to be a safer and more flexible form of communication. Such a capability enables, for example, college professors or high school teachers to allow their students text them in a safe and controllable manner, for users of social networks such as FACEBOOK® or MYSPACE® to text each other, and for every internet domain proprietor to provide a new way to engage and communicate with their users.

The system and method of the present invention allow mobile phone users to obtain, and content providers to provide, information via a variety of media including mobile phone text messaging. The inventive system replicates the organizational structure of the internet, making it easy for users to find the desired information via concise message request, and allows content providers to disseminate any subset of the information they make available on the internet—the subset that is most useful and relevant in a mobile setting. Concise messages requests are typically short, and the inventive system makes it easy and fast to send and receive small amounts of information using a mobile phone. The organizing principle of the system for text messaging is that the first word of the text message request, possibly combined with the phone number the message was sent to, specifies the internet domain name being requested.

A language called the "Concise Message Routing Language" or "CMRL" plays a similar role to the inventive system that HTML plays to the world wide web—it describes content. However, CMRL is specifically designed to provide content "routing" information, enabling concise message requests to be routed effectively and efficiently to the responses from content providers that are appropriate, using media such as mobile phone text messaging. This makes it ideal for describing content that is intended to be accessed in a mobile setting, where slow data transfer rates often make browsing the internet on a mobile-phone browser a frustrating experience. The organization of the present invention provides means for conducting financial transactions and communicating between individuals or groups without disclosing personal and private information.

Other embodiments, applications and modifications of the present invention will occur readily to those of ordinary skill in the art in view of these description and examples provided herein. Accordingly, the scope of the invention is to be limited only by the following claims which include all such other embodiments and modifications when viewed in conjunction with the foregoing specification and accompanying drawings.

The invention claimed is:

1. A method for communication between a communication device adapted for communicating with a network and a content provider associated with an internet domain name, wherein the network is configured for transmitting concise messages, the method comprising:

providing an interface between the network and the internet domain;

assigning at least one channel for accessing the network through the communication device, wherein the at least one channel comprises a short code comprising "DOT" combined with a top-level internet domain;

storing a set of routing instructions corresponding to the content provider on a server, the set of routing instructions comprising at least one query response;

receiving a request generated by the communication device, wherein the request comprises a combination of the at least one channel and a designator, the combination comprising the internet domain name of the content provider for mapping the request to the set of routing instructions, and, optionally, a request instruction;

routing the request as directed by the set of routing instructions to generate a response to the request; and transmitting concise message content to the communication device comprising the response to the request.

2. The method of claim 1, wherein the top-level internet domain is selected from the group consisting of com, gov, edu, org, biz, net, info, and pro.

3. The method of claim 1, wherein the designator comprises the complete internet domain name of the content provider.

4. The method of claim 1, wherein the request instruction comprises one or more instructions selected from the group consisting of path, argument, directive, and directive argument.

5. The method of claim 4, wherein a directive and a directive argument comprise an action to be executed by a request handler within the network.

6. The method of claim 1, wherein the request does not include a request instruction and the response to the request comprises a message.

7. The method of claim 1, wherein the request instruction comprises a text string specifying a commerce transaction and the network further comprises a billing module for transferring funds in response to a query.

8. The method of claim 1, wherein the query comprises a text string specifying a commerce transaction and the set of routing instructions includes a listing of items available for purchase.

9. The method of claim 8, wherein the set of routing instructions further includes a listing of options corresponding to items available for purchase.

10. The method of claim 1, wherein the set of routing instructions comprises a concise message document comprising at least one match tag defining a pattern to compare against the query instruction.

11. The method of claim 10, wherein comparing includes identifying pattern equivalents comprising one or more of misspelled words, partial and phonetic matches, abbreviations, missing punctuation, and acronyms.

12. The method of claim 1, wherein the designator further comprises account information for a user defined by the content provider and associated with the internet domain name.

13. The method of claim 1, wherein the communication device includes programming for generating a custom concise message request that automatically specifies one or more parts of the concise message request.

14. The method of claim 1, wherein the request instruction comprises an argument and the set of routing instructions forwards the argument to one or more other users.

15. The method of claim 14, wherein each of the one or more other users registers a unique contact identifier with the content provider, wherein, when the concise message request includes a match to a registered unique contact identifier, the argument is forwarded to the registered user.

16. A system for communication between a communication device and a content provider associated with an internet domain name and a server, wherein the communication device is adapted for communicating with a network configured for transmission of concise messages, the system comprising:

an interface between the network and an internet connection to the content provider's server;

wherein a communication device user enters a concise message request into the communication device comprising a channel, a designator and, optionally, a request instruction, wherein the channel comprises a short code comprising "DOT" combined with a top-level internet domain, and wherein a combination of the channel and the designator specifies a location on the internet of an engine comprising routing instructions to the network for responding to the concise message request and generating a concise message response for output to the communication device.

17. The system of claim 16, wherein the top-level internet domain is selected from the group consisting of com, gov, edu, org, biz, net, info, and pro.

18. The system of claim 16, wherein the designator comprises the complete internet domain name of the content provider.

19. The system of claim 16, wherein the request instruction comprises one or more instructions selected from the group consisting of path, argument, directive, and directive argument.

20. The system of claim 19, wherein a directive and a directive argument comprise an action to be executed by a request handler within the network.

21. The system of claim 16, wherein the request does not include a request instruction and the response to the request comprises a message.

22. The system of claim 16, wherein the request instruction comprises a text string specifying a commerce transaction and the network further comprises a billing module for transferring funds in response to a query.

23. The system of claim 16, wherein the query comprises a text string specifying a commerce transaction and the set of routing instructions includes a listing of items available for purchase.

24. The system of claim 23, wherein the set of routing instructions further includes a listing of options corresponding to items available for purchase.

25. The system of claim 16, wherein the set of routing instructions comprises a concise message document comprising at least one match tag defining a pattern to compare against a query.

26. The system of claim 25, wherein comparing includes identifying pattern equivalents comprising one or more of misspelled words, partial and phonetic matches, abbreviations, missing punctuation, and acronyms.

27. The system of claim 16, wherein the designator further comprises account information for a user defined by the content provider and associated with the internet domain name.

28. The system of claim 16, wherein the communication device includes programming for generating a custom concise message request that automatically specifies one or more parts of the concise message request.

29. The system of claim 16, wherein the request instruction comprises an argument and the set of routing instructions forwards the argument to one or more other users.

30. The system of claim 29, wherein each of the one or more other users registers a unique contact identifier with the content provider, wherein, when the concise message request includes a match to a registered unique contact identifier, the argument is forwarded to the registered user.

31. A system for communication over a network between a mobile communication device having a short message function and a content provider associated with an internet domain name and a server, wherein the network is adapted for transmission of short messages, the system comprising:

an interface between the network and an internet connection to the content provider's server;

wherein a communication device user enters a concise message request into the communication device comprising a channel, a designator and, optionally, a query instruction, wherein the channel comprises a short code comprising "DOT" combined with a top-level internet domain, and wherein a combination of the channel and the designator specifies a location on the internet of a document comprising routing instructions to the network for responding to the concise message request and generating an output to the communication device.

* * * * *